Oct. 12, 1965   J. BOYCE ETAL   3,210,917
APPARATUS FOR HARVESTING VINE GROWN CROPS
Filed Aug. 29, 1961   16 Sheets-Sheet 1
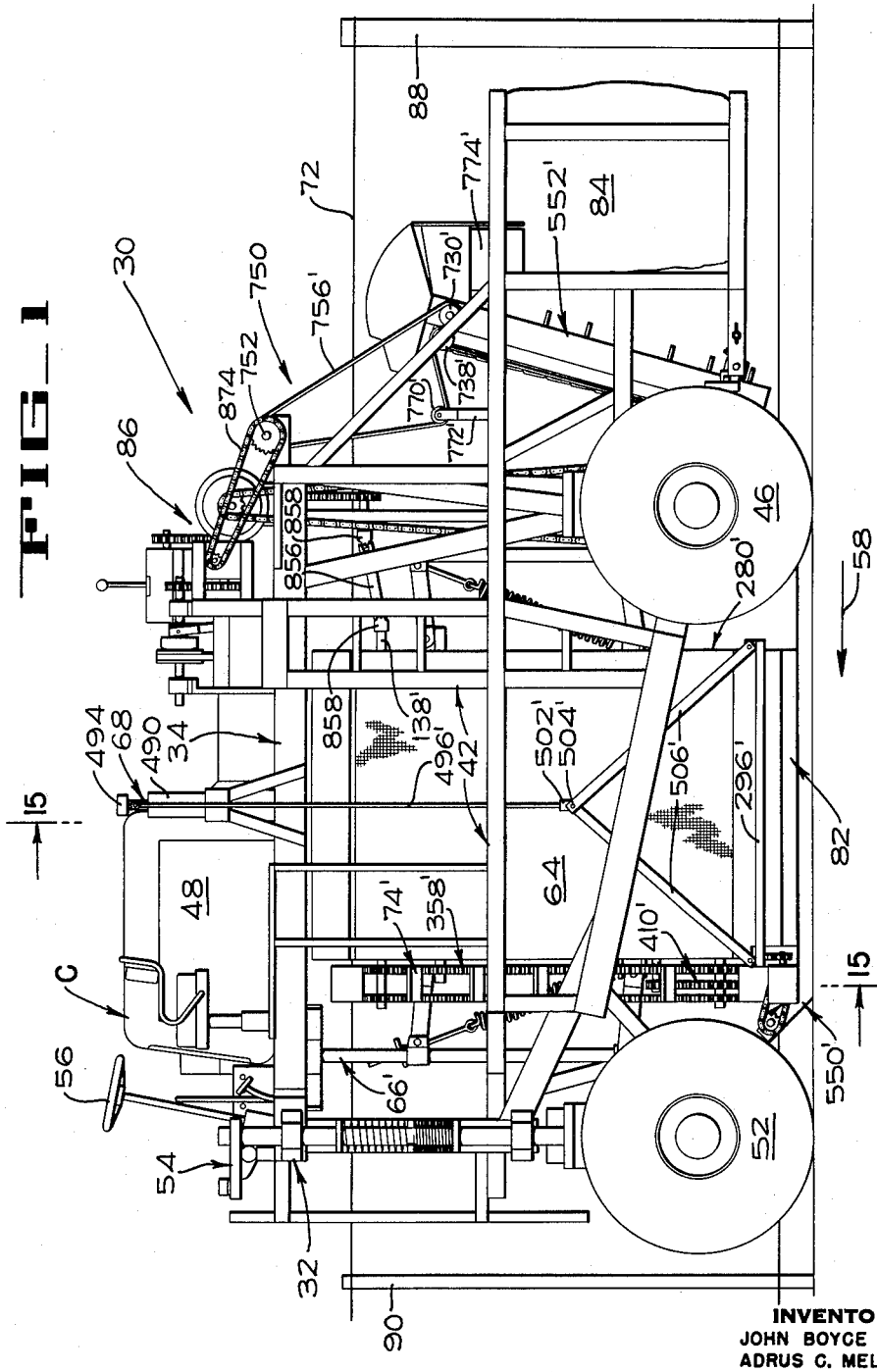
INVENTORS
JOHN BOYCE
ADRUS C. MELTON
BY
ATTORNEY

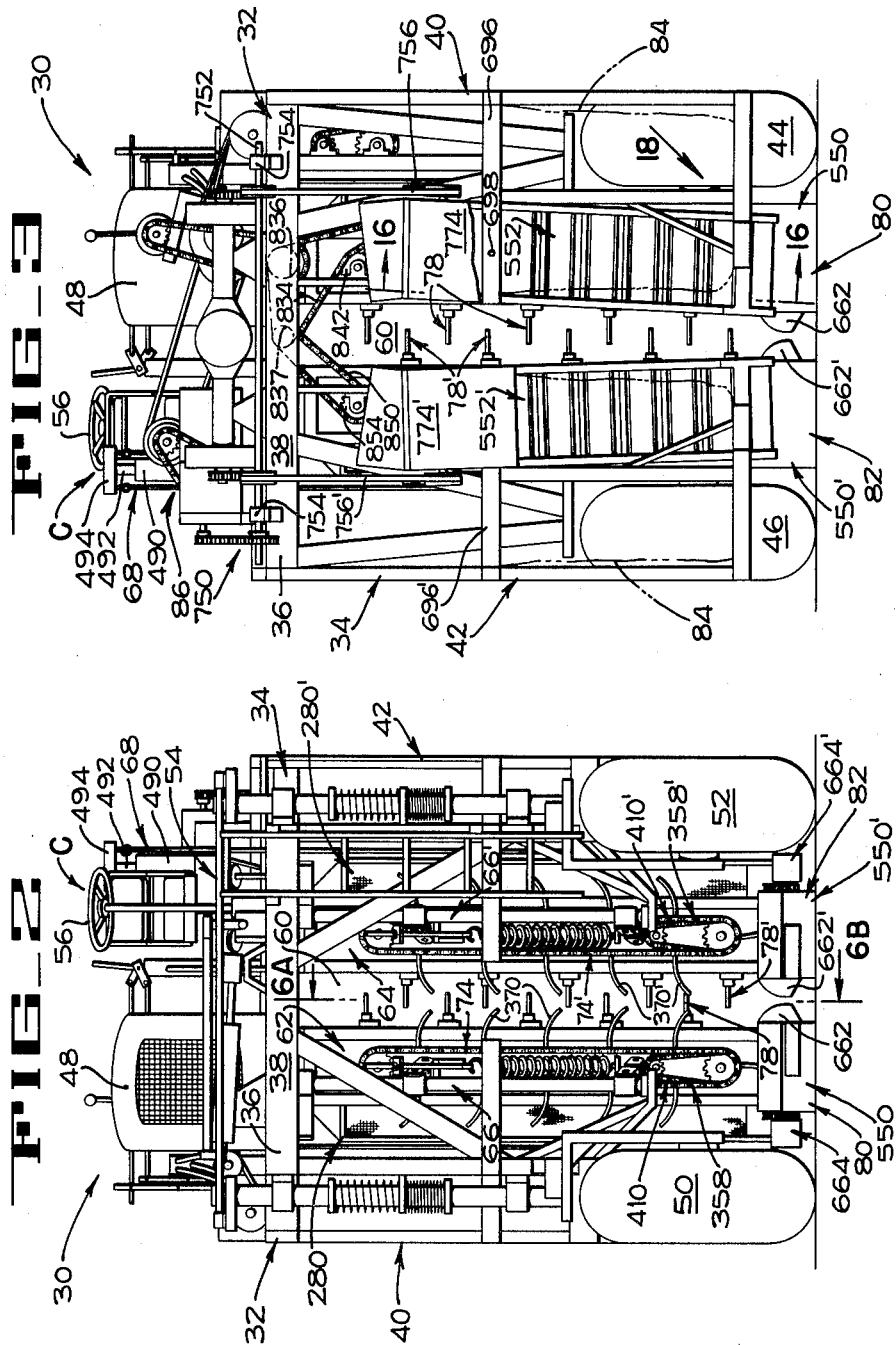

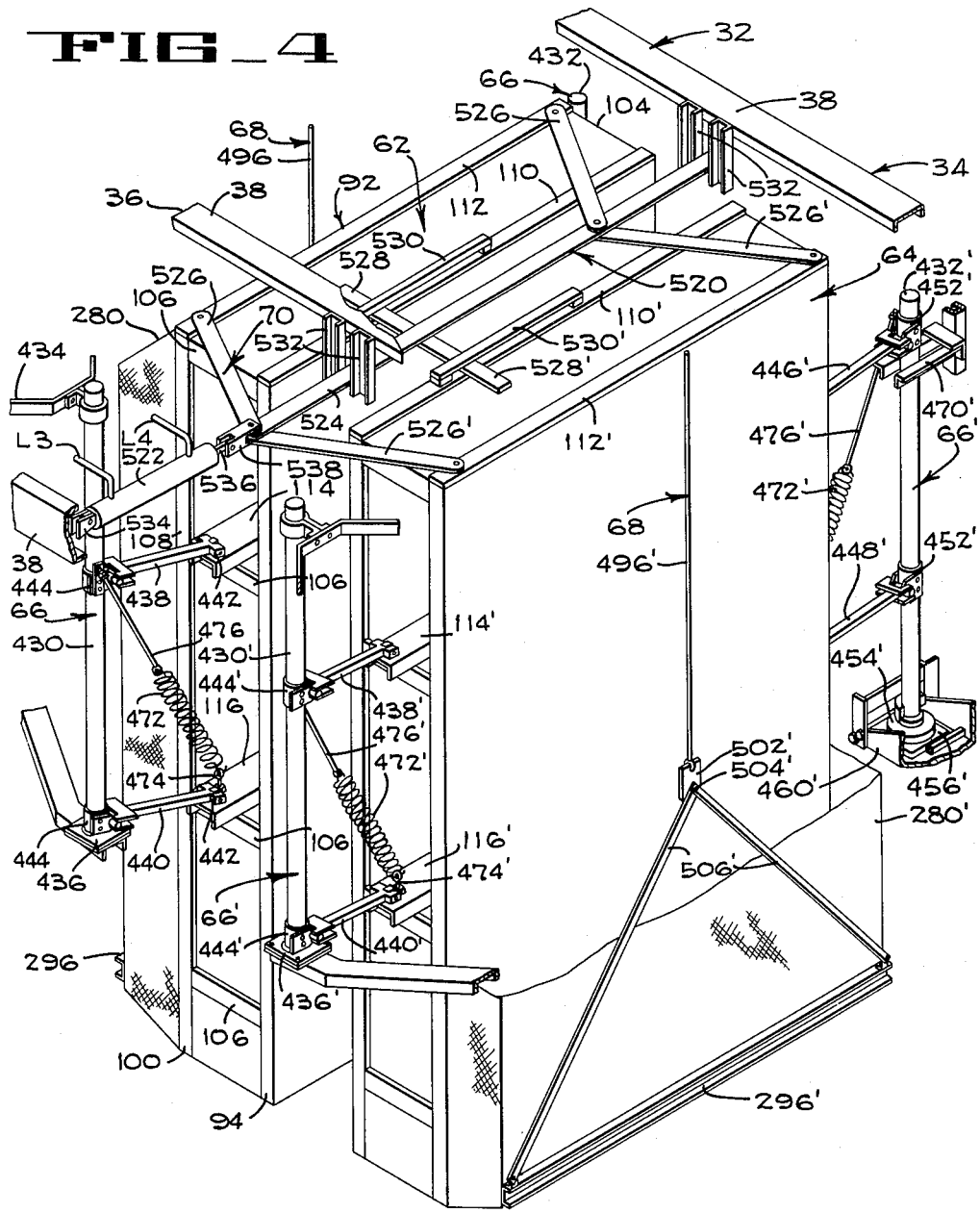

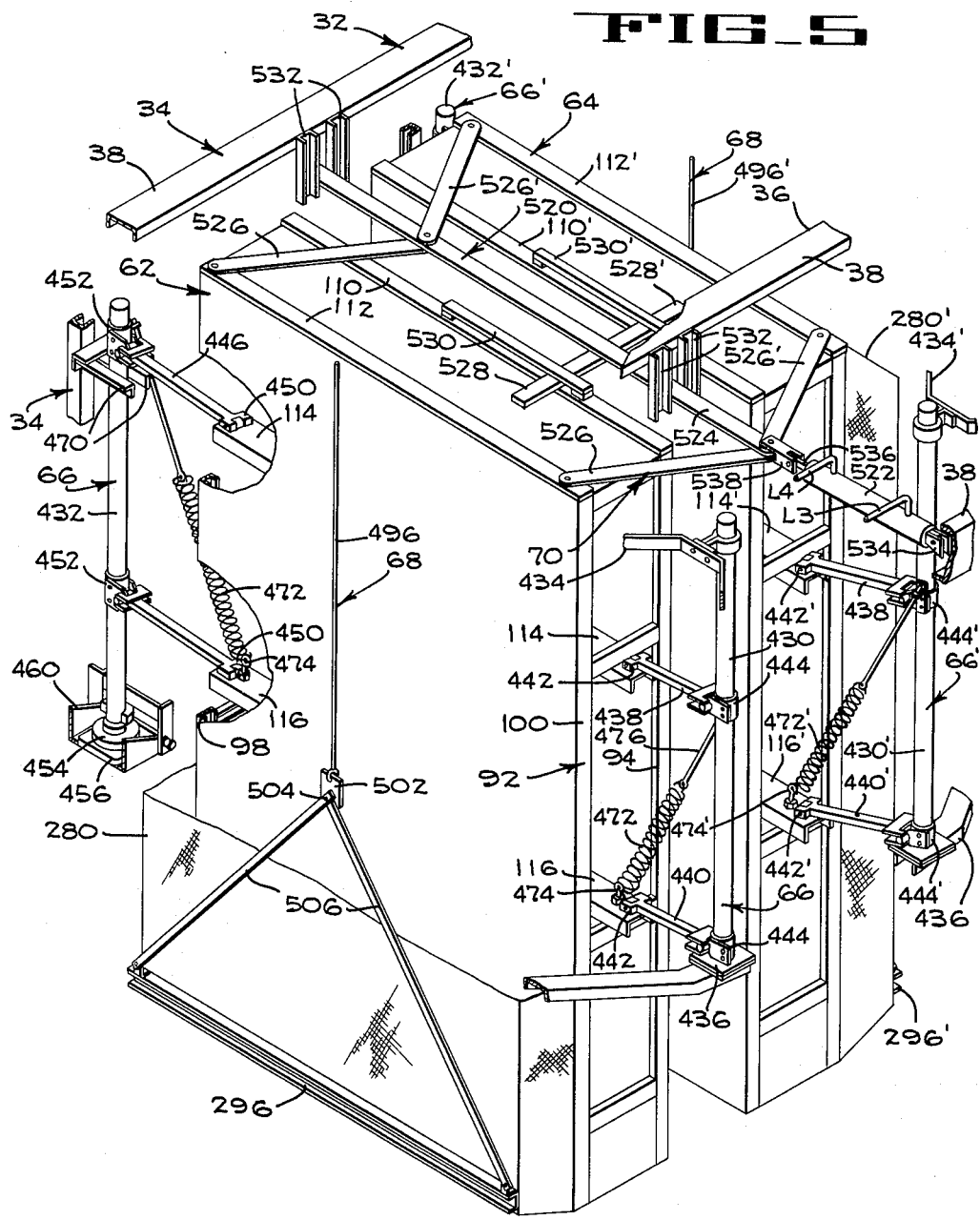

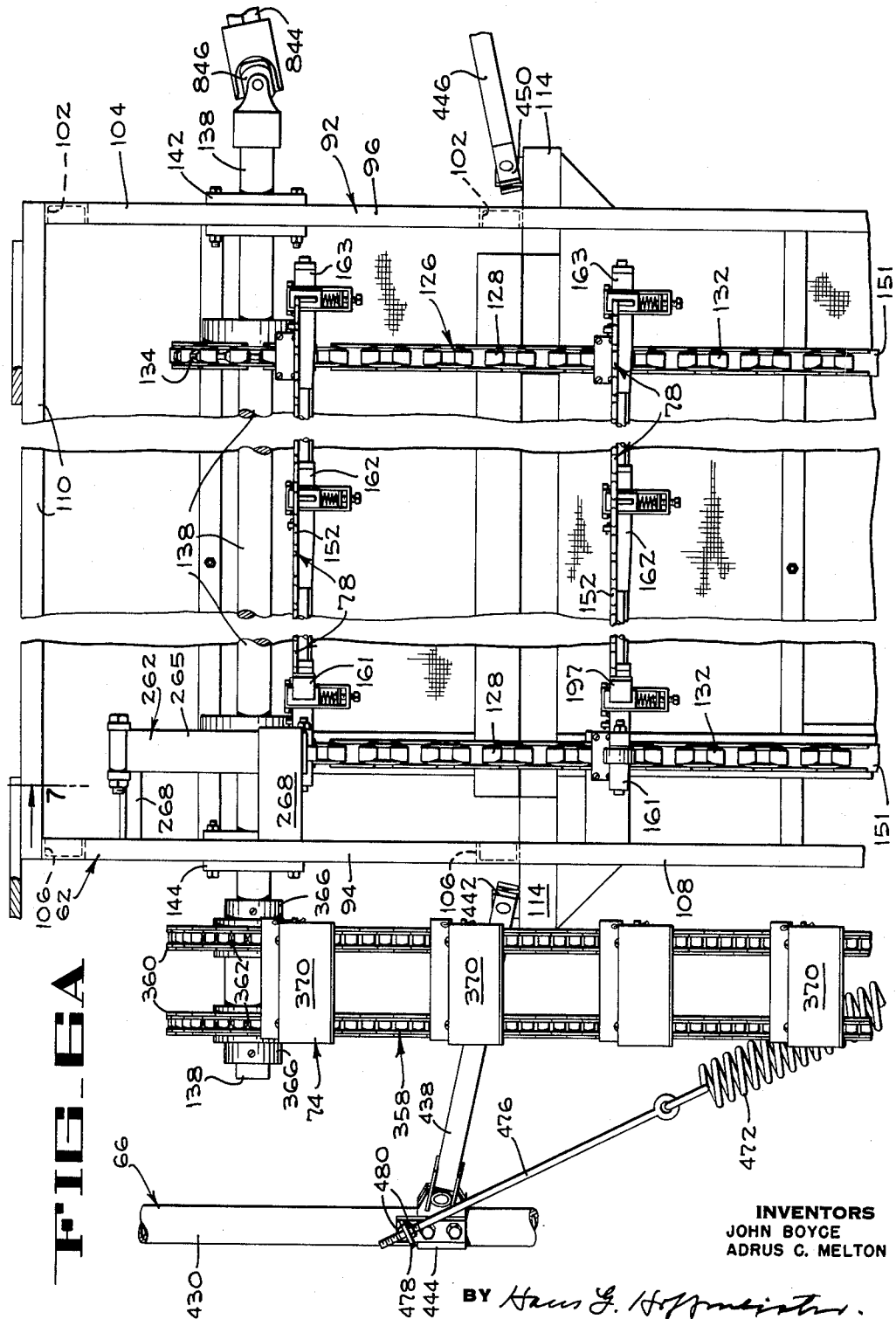

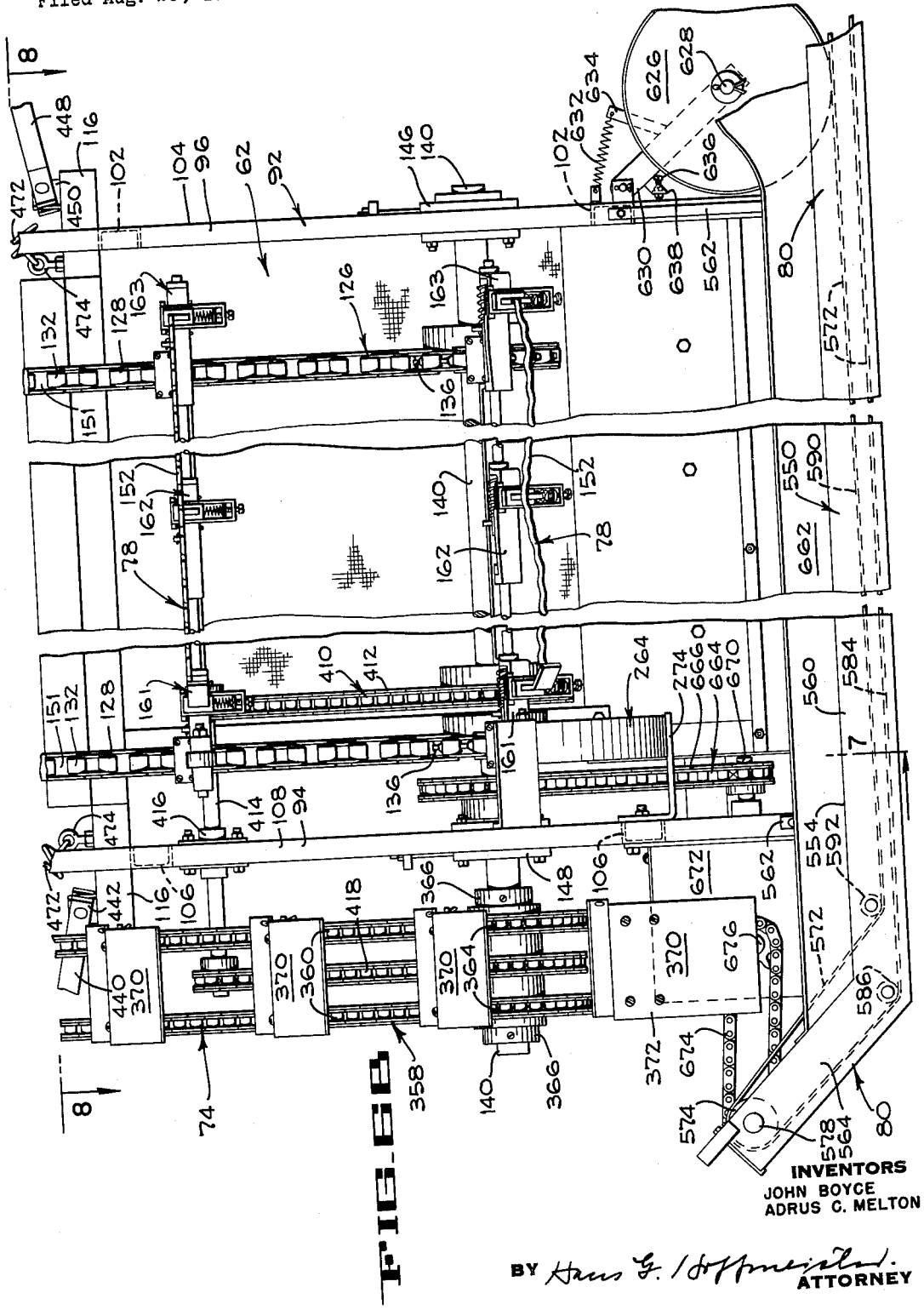

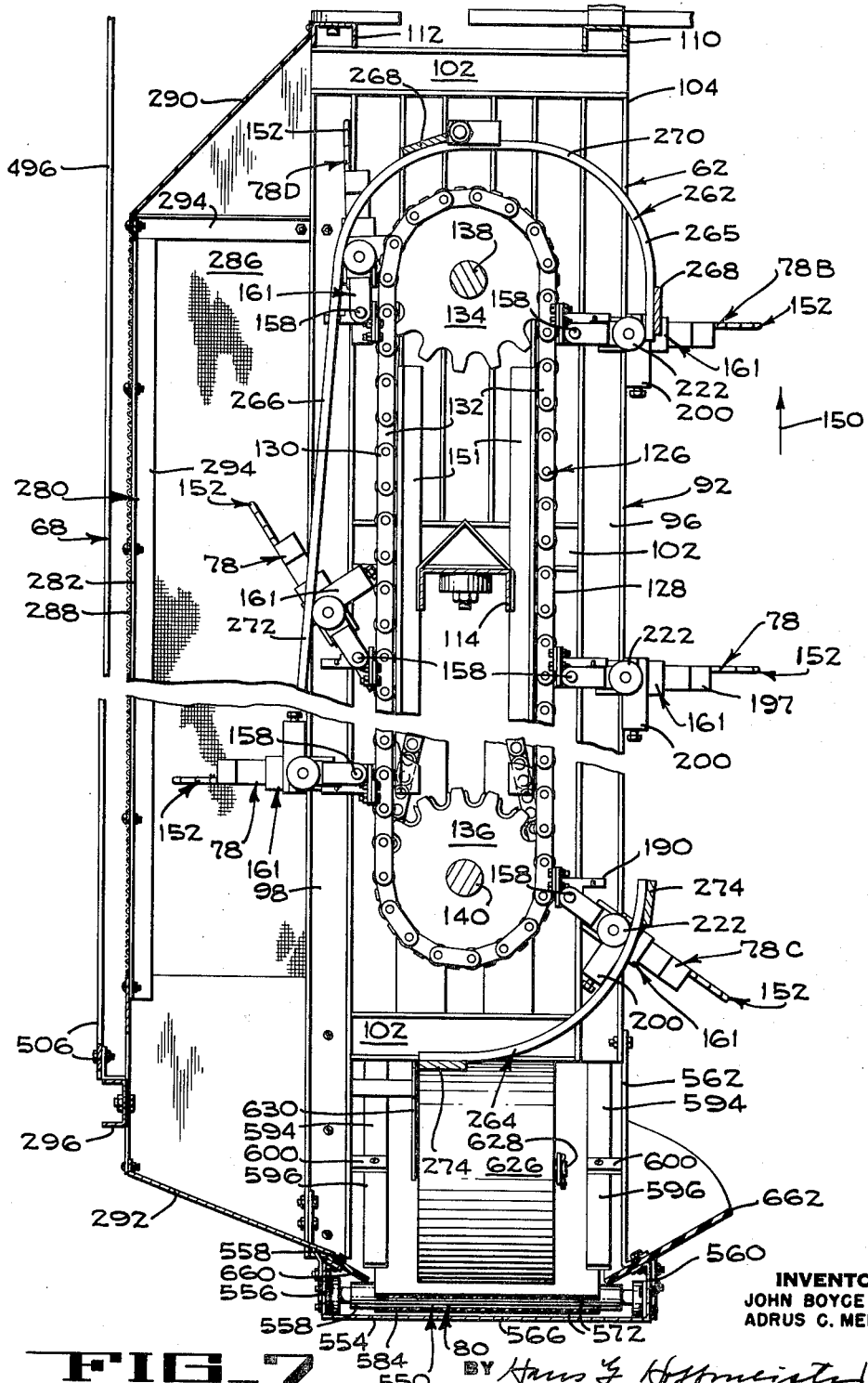

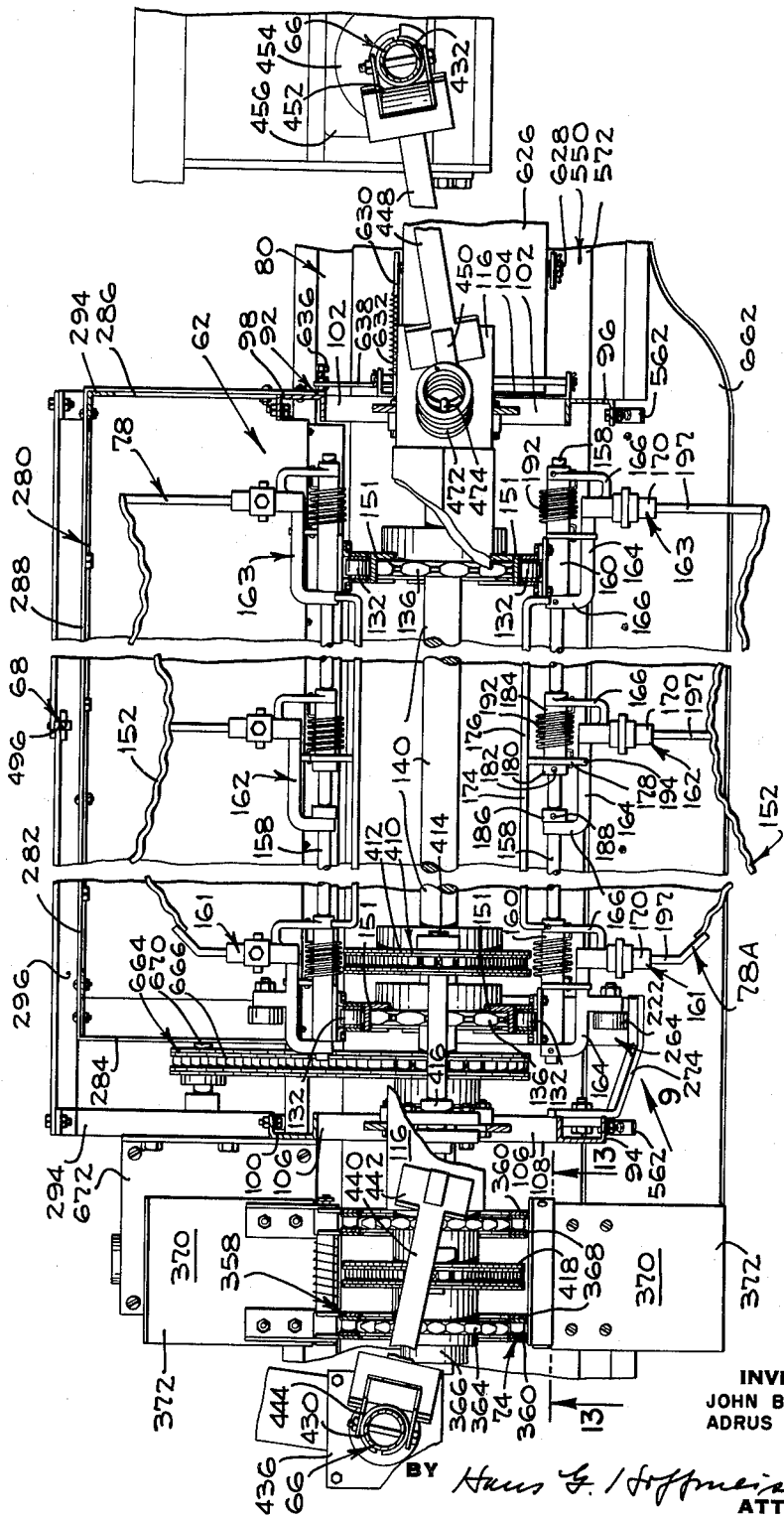

Oct. 12, 1965 J. BOYCE ETAL 3,210,917
APPARATUS FOR HARVESTING VINE GROWN CROPS
Filed Aug. 29, 1961 16 Sheets-Sheet 9
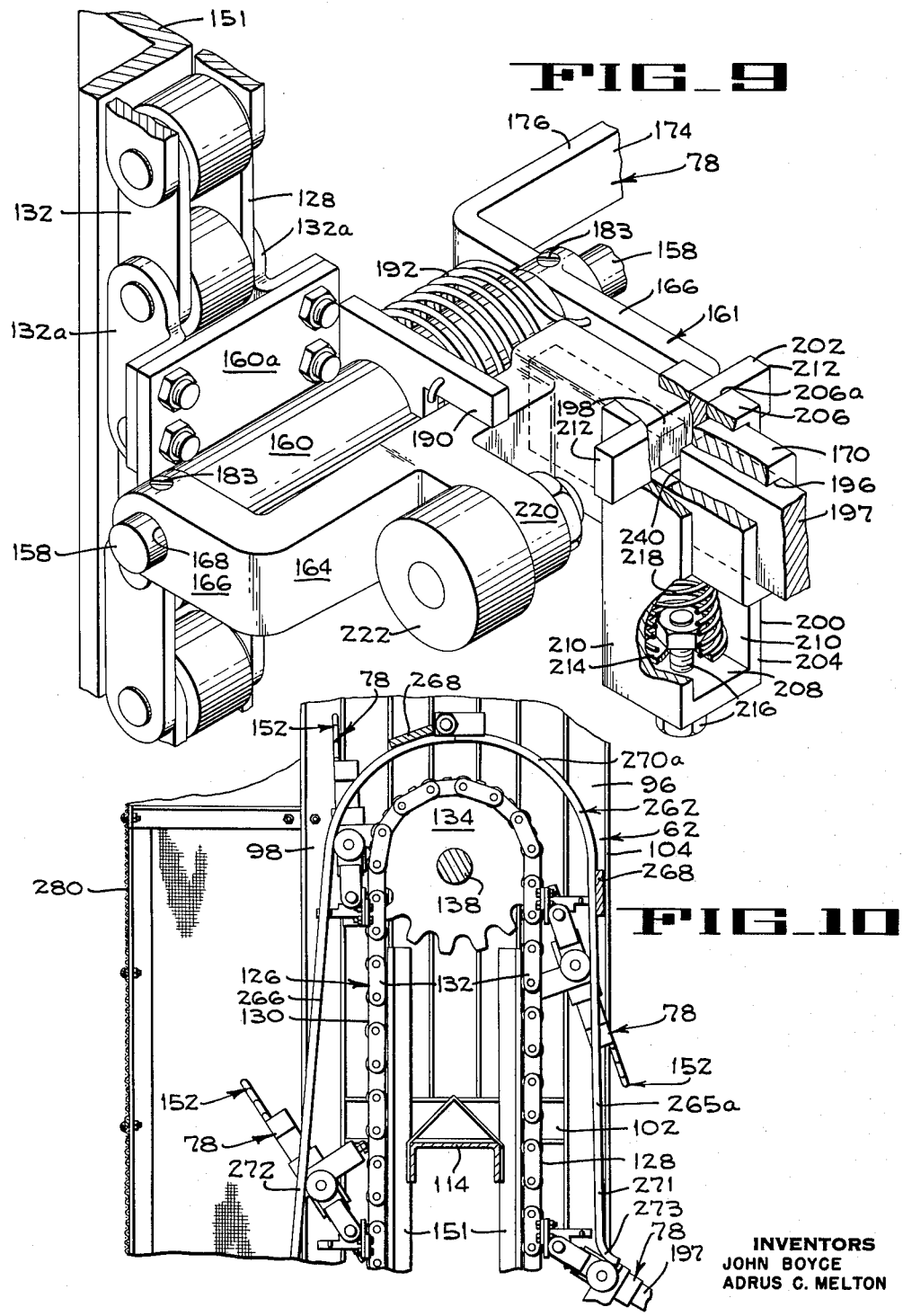
INVENTORS
JOHN BOYCE
ADRUS C. MELTON
BY Hans G. Hoffmeister
ATTORNEY

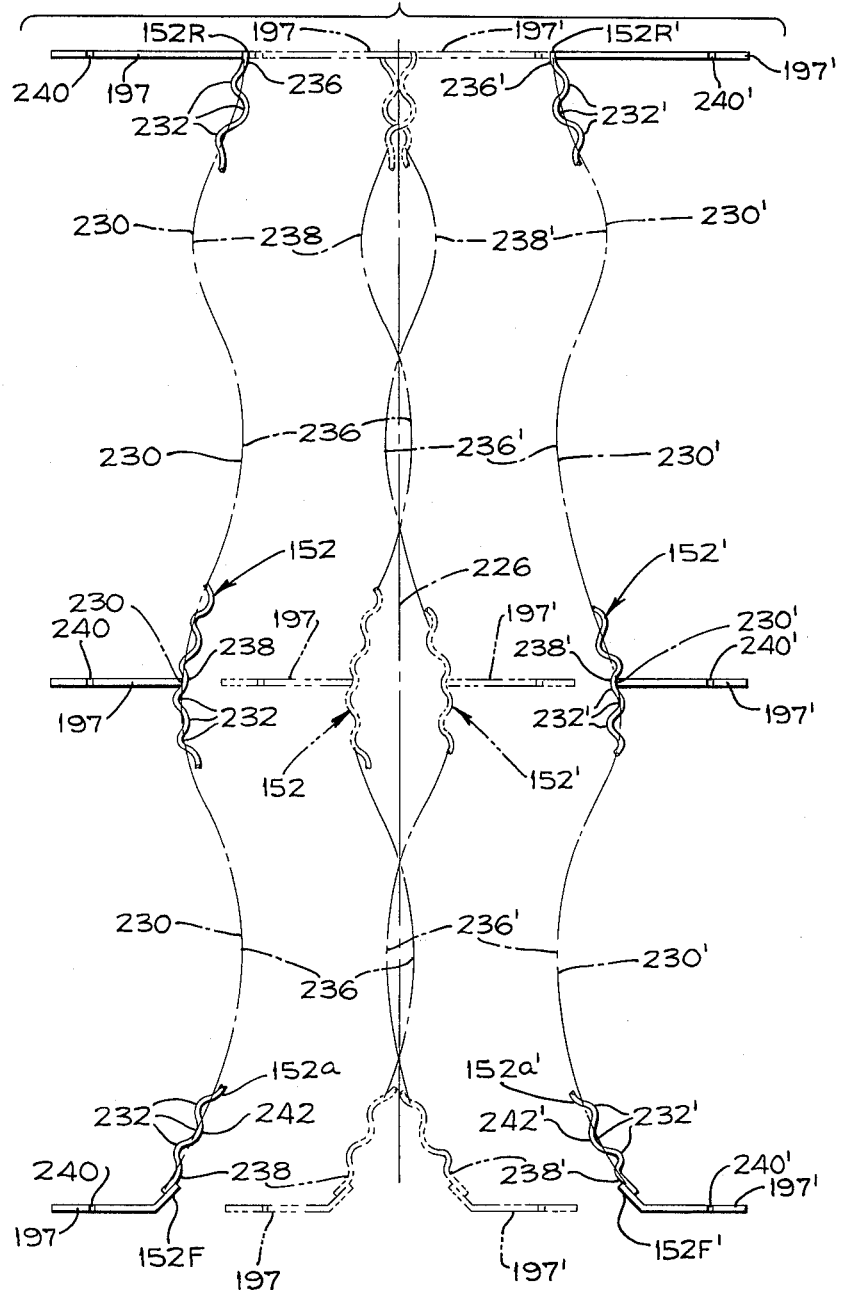

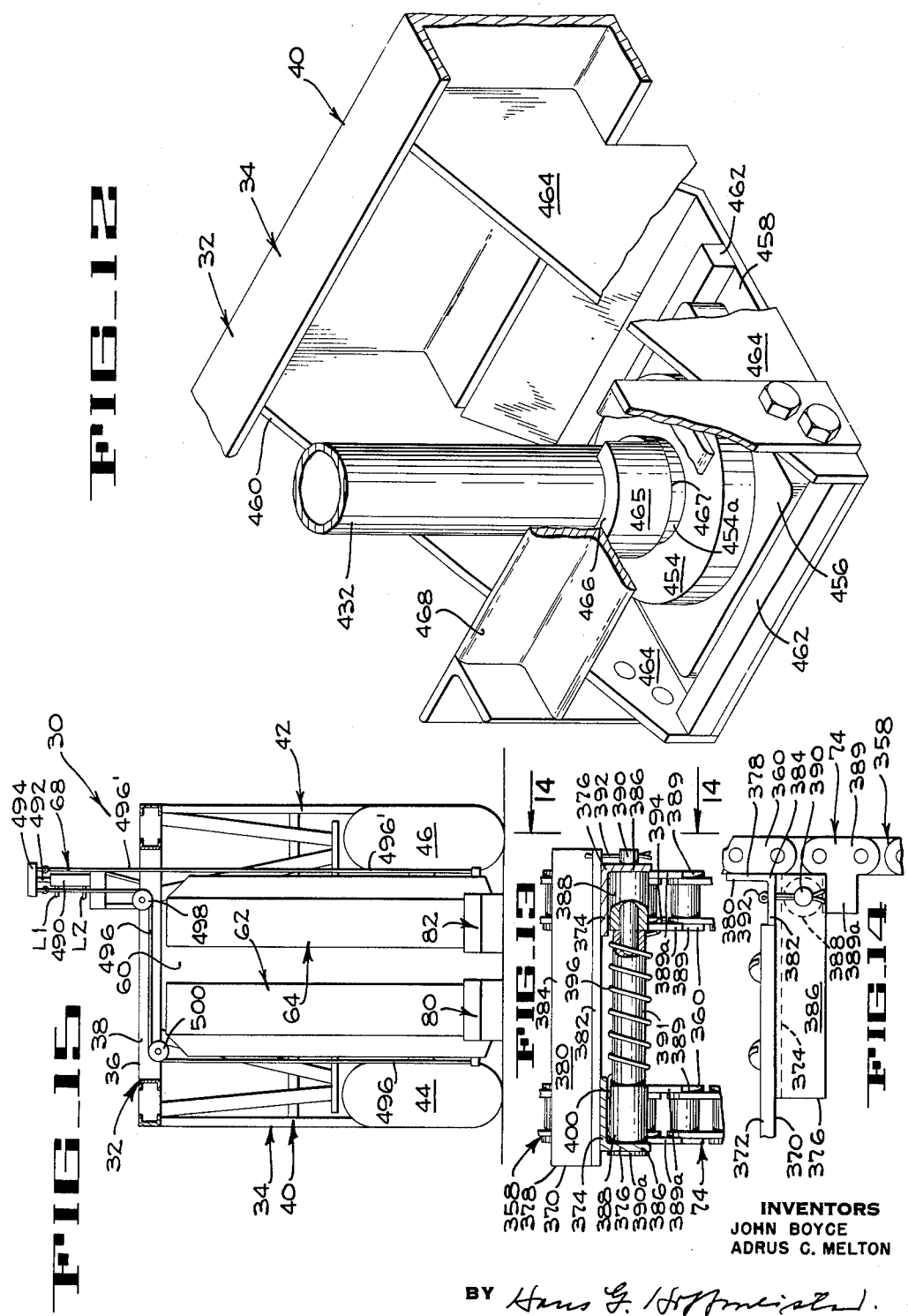

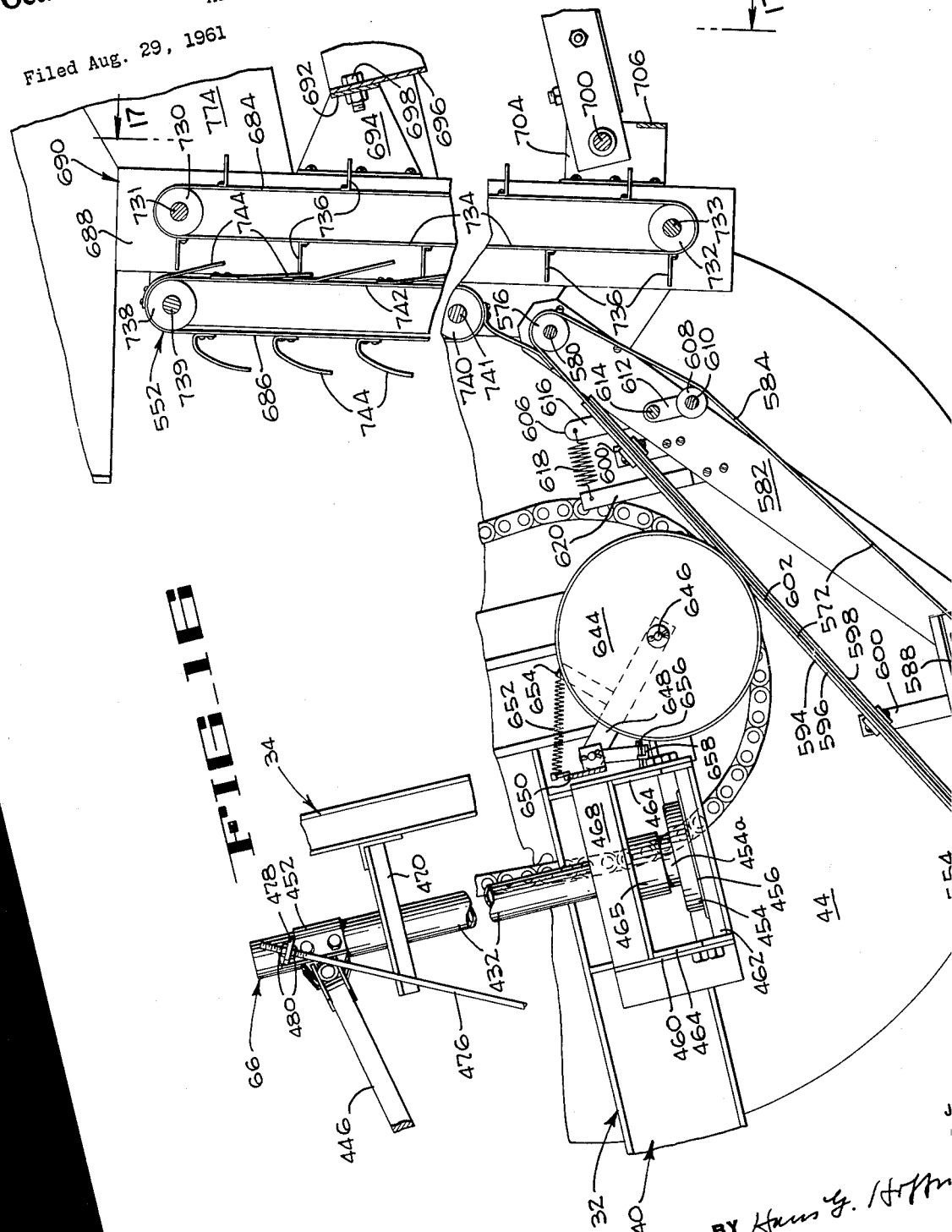

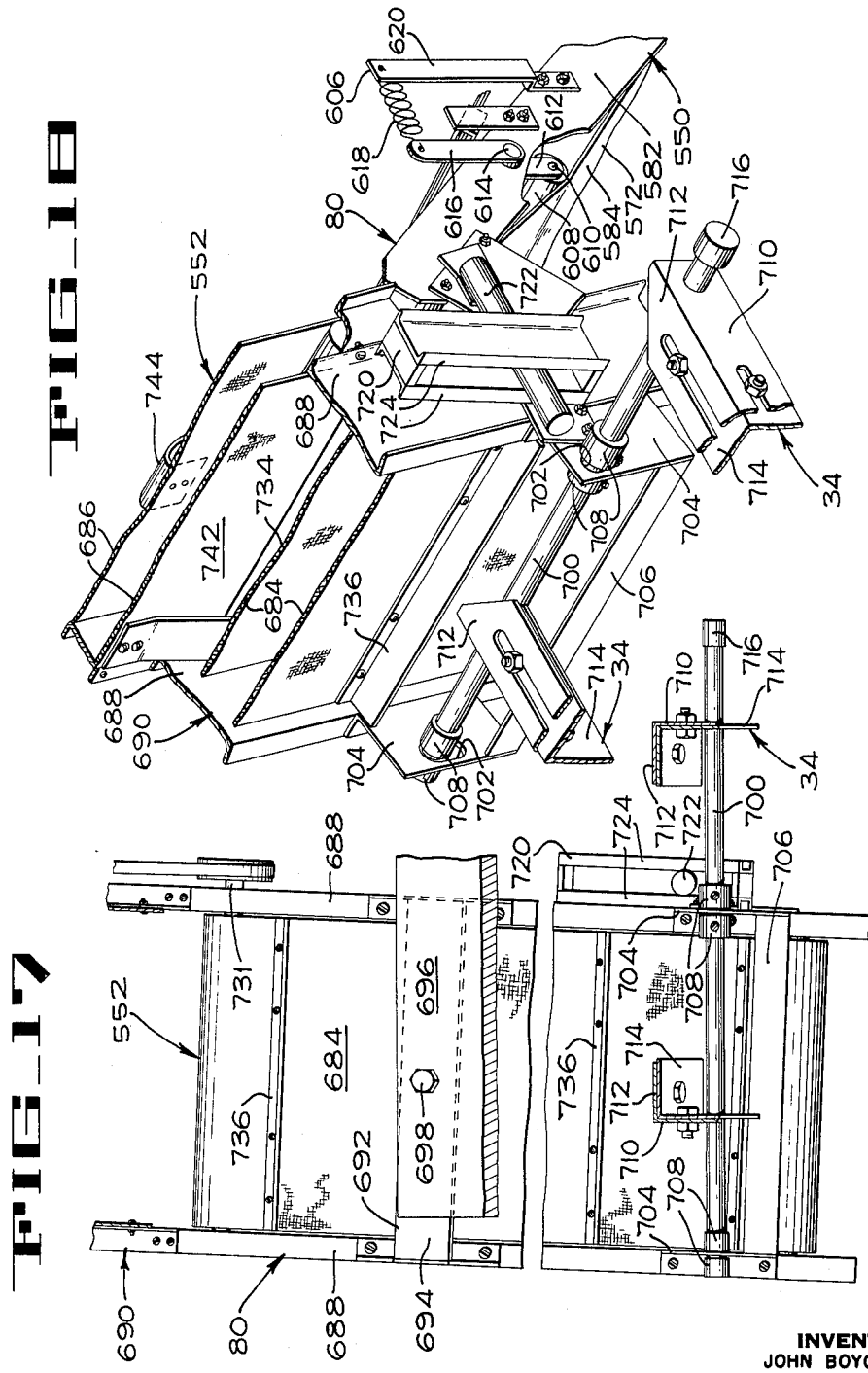

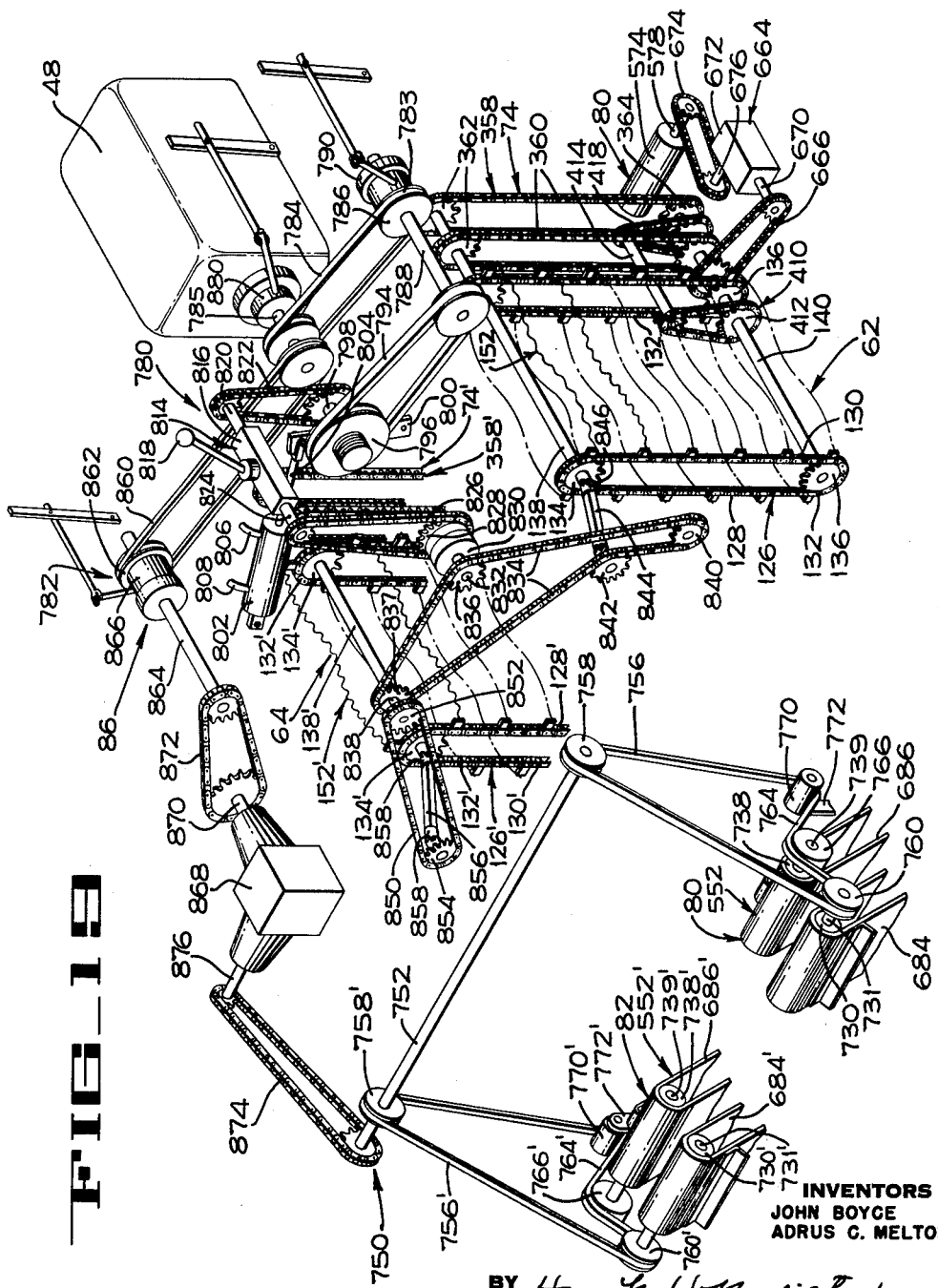

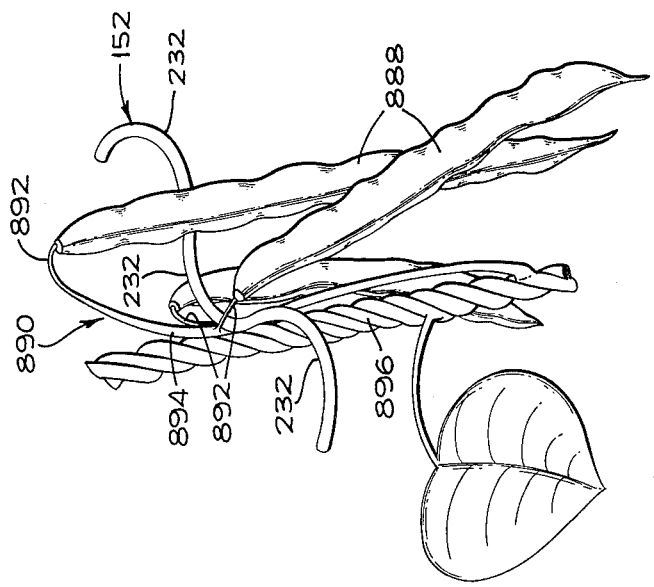
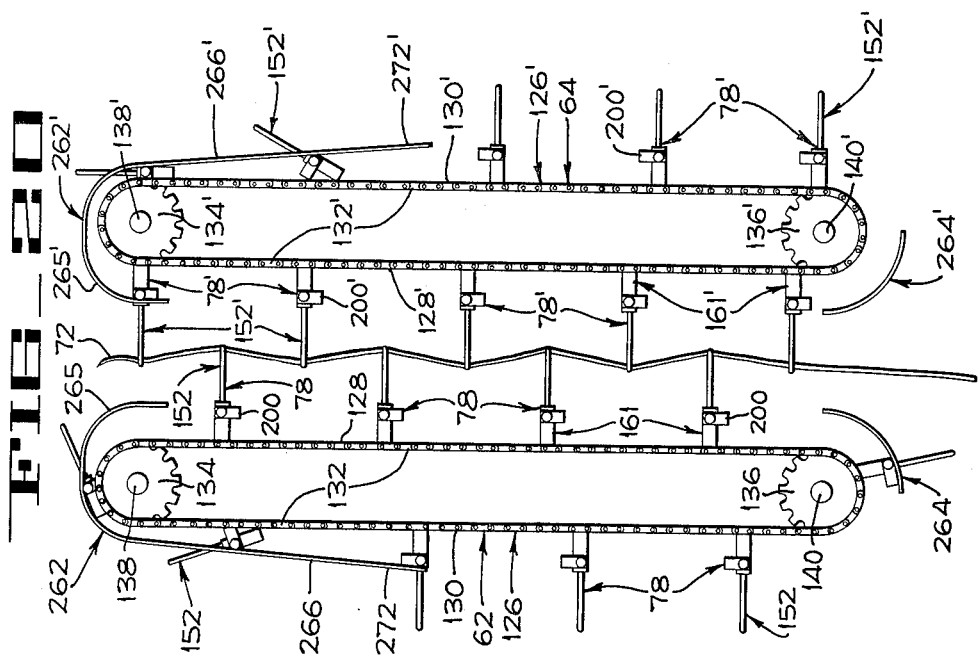

Oct. 12, 1965    J. BOYCE ETAL    3,210,917
APPARATUS FOR HARVESTING VINE GROWN CROPS
Filed Aug. 29, 1961    16 Sheets-Sheet 16
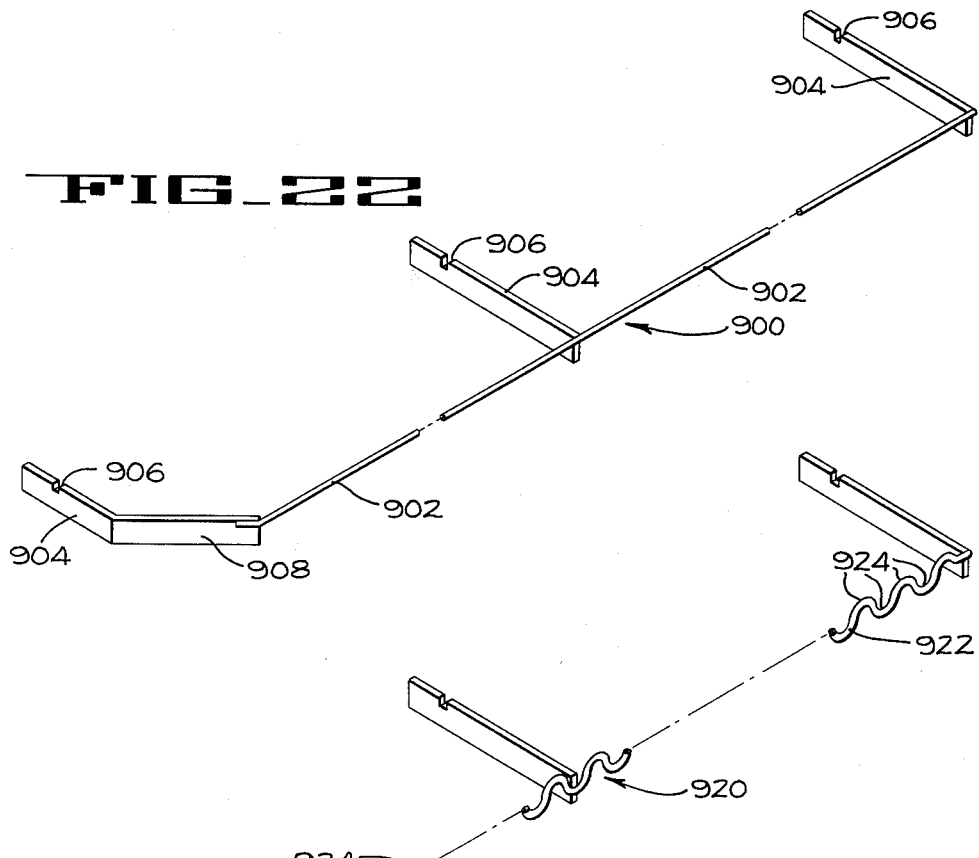
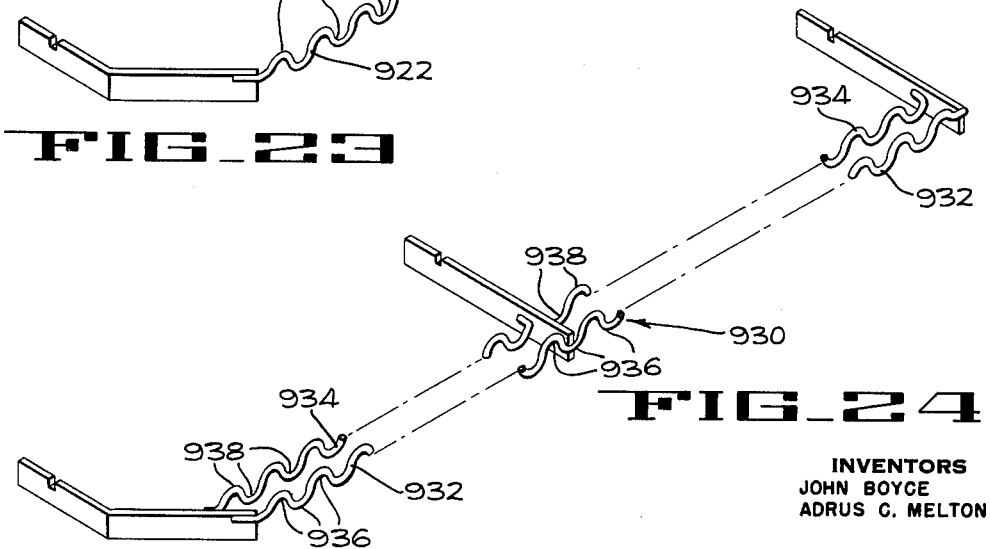
INVENTORS
JOHN BOYCE
ADRUS C. MELTON
BY
ATTORNEY

United States Patent Office 3,210,917
Patented Oct. 12, 1965

3,210,917
APPARATUS FOR HARVESTING VINE
GROWN CROPS
John Boyce, San Jose, Calif., and Adrus C. Melton, Vancouver, Wash., assignors to FMC Corporation, San Jose, Calif., a corporation of Delaware
Filed Aug. 29, 1961, Ser. No. 134,645
14 Claims. (Cl. 56—19)

The present invention appertains to harvesting vine grown crops and relates more particularly to apparatus for harvesting beans.

Certain varieties of bean plants, which grow in the form of climbing vines and are noted for their heavy production of edible pods throughout a long period of production, are commonly grown in rows as a field crop. To support the plants while they are growing, a fence-like structure is provided which usually includes, throughout its length, a plurality of spaced supporting poles or posts, between which vertically spaced, horizontal wires are stretched. The bean plants, known as "pole beans," grow up the fence and around the wires and form a matted row of vines usually from six to seven feet in height and having a thickness that varies from as little as four inches to as much as twenty inches.

Clusters of bean blossoms appear first adjacent the ground and, as the plants grow upward, other blossom clusters appear at progressively higher levels and at progressively later times. Additionally, the individual blossoms of each blossom cluster develop at progressively later times in the formation of the edible pods, hereinafter called "beans." For these reasons, the beans adjacent the ground are first to reach a suitably mature condition of from three to six inches in length, at which time they are ready for harvesting. It will be apparent that as the growing season advances, mature beans can be harvested from the plants, not only adjacent the ground but also at progressively higher levels.

Harvesting operations, whether performed by hand labor or machine, are hindered by the heavy growth of foilage consisting of the large and numerous leaves common to bean plants. Frequently also, the bean vines grow to a greater length than the general height of the plant rows so that the trailing end portions of the vines bend down and overhang the sides of the rows and further hinder harvesting operations. Additionally, the humidity and temperature of the weather affect the harvesting operation. When the weather is cool and moist the vines are generally more brittle and, as a result, the connection of the beans to the vines can be more easily broken than when the weather is warm and dry and the bean vines are somewhat wilted. These various growth characteristics and weather conditions combine to create a plurality of harvesting problems that have not been solved by known bean harvesting machines. For these reasons, beans are usually harvested by hand labor which is both slow and costly.

It is, therefore, an object of the present invention to provide an improved bean harvesting machine.

Another object is to provide improved means for accommodating a bean harvester to the difficult and varied conditions encountered in harvesting beans.

Another object is to provide improved picking means in a bean harvester.

Another object is to provide a bean harvester employing an improved apparatus for setting the bean vines in motion to aid in bringing beans, located deep within the plant row, into a position where they will be engaged and picked.

Another object is to provide an improved apparatus for harvesting pole beans which enables the harvester to perform a bean picking operation in which a high percentage of mature beans are picked while the beans sustain little or no damage.

Another object is to provide an improved apparatus for harvesting beans which assures that the vines, their blossoms and the immature beans remain undamaged thereby making it practical to harvest beans several times throughout the growing season.

Another object is to provide an improved apparatus for harvesting beans simultaneously from both sides of a row of bean plants.

Another object is to provide improved means, in a bean harvester having opposite picker heads, for adjusting the positions of the picker heads horizontally.

Another object is to provide improved picker head mounting means in a bean harvester.

Another object is to provide improved means for vertically adjusting the position of the picker heads in a bean harvester and, at the same time, partially counterbalancing the weight of the picker heads so that they yield upward readily when encountering an obstruction of the ground.

Another object is to provide improved picker bars in a bean harvesting machine, which bars lock the beans in position on the picker bars to prevent flipping of the beans over and out of bean picking engagement therewith.

Another object is to provide an improved picker ba[r ma]chine to pick beans growing close to poles.

Another object is to provide improved picker b[ar] mounting means in a bean harvesting machine.

Another object is to provide means for lifting [the] foliage and the overhanging vine ends of the bean pla[nts] to efficiently expose the beans to the action of the pic[ker] bars.

Another object is to provide, in a bean harves[ting] machine, an improved conveyor system which ena[bles] the machine to perform its picking operation close[r to] the ground than has heretofore been possible.

Another object is to provide means in a machin[e for] harvesting beans from row-grown bean plants to va[ry the] height to which the beans are picked.

Another object is to provide improved apparatu[s for a] pole bean harvester which enables the harvester t[o per]form its picking operation closer to the ground t[han] known harvesters.

These and other objects and advantages of the [present] invention will become apparent from the follow[ing de]scription and the accompanying drawings, in [which:]

FIG. 1 is an elevation of the left side of t[he] harvesting machine of the present invention.

FIGS. 2 and 3 are front and rear elevations[, respec]tively, of the harvesting machine shown in FIG[. 1.]

FIG. 4 is an enlarged diagrammatic perspectiv[e of] a portion of the harvester of the present inve[ntion in]cluding two picker heads with their mounting and position adjusting apparatus as viewed fr[om] at the front left hand side of the harvester.

FIG. 5 is similar to FIG. 4 but shows the p[arts] as viewed from above at the front right ha[nd of] the harvester.

FIGS. 6A and 6B are enlarged elevations, broken away, of the upper and lower port[ions, respec]tively, of the right hand picker head, said taken looking in the direction of arrows 6A—[6A] and forming a fragmentary composite vie[w] of the picker head.

FIG. 7 is a vertical transverse section [of the right] hand picker head, partly broken away, tak[en on line] 7—7 of the composite view of FIGS. 6A an[d 6B.]

FIG. 8 is a horizontal section of the rig[ht]

head, partly broken away, taken along lines 8—8 of FIG. 6B.

FIG. 9 is an enlarged perspective showing a portion of a picker bar assembly of the right hand picker head, as viewed from above in the direction indicated in general by the arrow 9 of FIG. 8.

FIG. 10 is a fragmentary vertical section similar to the upper portion of FIG. 7 showing, in particular, a modified form of picker bar control cam.

FIG. 11 is an enlarged plan of the right and left hand picker bars showing the picker bars in full lines, partly broken away, as they would appear removed from the picker heads and in inoperative relation. This figure also shows the picker bars in phantom in overlapped, operative relation.

FIG. 12 is an enlarged perspective, with certain parts broken away, showing the rear support shaft mounting bracket for the right hand picker head.

FIG. 13 is an enlarged section showing part of a foliage lifting device of the right hand picker head, taken along lines 13—13 of FIG. 8.

FIG. 14 is a fragmentary side elevation of the structure shown in FIG. 13, taken looking in the direction of arrows 14—14 thereof.

FIG. 15 is a reduced diagrammatic transverse section of the harvester, certain part being broken away, taken along lines 15—15 of FIG. 1 and showing the picker head height adjusting apparatus.

FIG. 16 is an enlarged fragmentary section taken along lines 16—16 of FIG. 3, showing the rear portion of a conveyor system partially included in FIG. 6B.

FIG. 17 is a fragmentary rear view of an elevator included in the conveyor system, taken looking in the direction of arrows 17—17 of FIG. 16.

FIG. 18 is a perspective of a portion of the conveyor system shown in FIGS. 6B and 16 as viewed from above the rear of the harvester, as indicated in general by arrow 18 of FIG. 3.

FIG. 19 is a reduced schematic perspective showing in particular the power train for the picker heads and the conveyor systems of the present bean harvester, as viewed above at the rear of the right hand side.

FIG. 20 is a reduced transverse diagrammatic section of the picker heads illustrating their operation.

FIG. 21 is a perspective showing a fragment of a bean and a portion of a picker bar and illustrating the picking operation.

FIGS. 22, 23, and 24 are fragmentary perspectives, view showing a different embodiment of the picker apted for use in the present bean harvester.

[T]he bean harvesting machine 30 (FIGS. 1, 2, and 3) [compri]ses a chassis 32 having a frame structure 34 of [general]ly inverted U-shaped cross section. The frame [structur]e 34 is fabricated of rigid structural members and [has] an upper horizontal portion 36 which is made up [of a plu]rality of transverse beams 38 (FIGS. 2, 3, and [15] and opposite, right and left hand side portions 40 [and 42,] respectively, projecting downward therefrom. [The gen]erally-arched inverted U-shaped arrangement is designed so that the machine can be driven along a row of [plan]ts with the row disposed in a longitudinal opening [60 (F]IG. 15) between the side portions 40 and 42 of [the fra]me.

[Side] portions 40 and 42 have rear wheels 44 and 46, [respectively] (FIG. 3), which are rotatably mounted thereto [spaced from] each other and are driven in a well known [manner (no]t shown) by a conventional motor 48 mounted [on the hori]zontal portion 36. Opposite dirigible wheels [50 and 52 are] mounted on the side portions 40 and 42, respectively, at the front of the frame structure 34 are [steered in] a well known manner by a steering mechanism [(FI]GS. 1 and 2) including a steering wheel 56. [It is und]erstood that the drive (not shown) connecting [motor] 48 and the rear wheels 44 and 46 includes [a speed] transmission (not shown) of any well known type. This transmission may be set so that the harvester 30 can be moved forward, as indicated by the arrow 58 (FIG. 1), at any one of several speeds for a particular motor speed, or can be moved backward. Conventional control mechanisms are provided adjacent the operator's station C for controlling the operation of the various mechanisms of the machine. Two bean picker heads 62 and 64 (FIGS. 4 and 15), which are located opposite each other in the longitudinal opening 60 of the frame, extend longitudinally of the machine 30 and are carried by the chassis in transversely spaced relation adjacent the side portions 40 and 42, respectively. The picker heads 62 and 64 are individually mounted in the frame 34 by mounting structures 66 and 66', respectively (FIGS. 4, 5, 8, and 16), for vertical and horizontal adjustment. Vertical adjustment of the picker heads 62 and 64 is provided (FIG. 15) by a height adjusting apparatus 68 by which they are raised and lowered uniformly and by which they can be raised to and held against movement below a selected height. A horizontal adjusting device 70 (FIGS. 4 and 5) moves the picker heads uniformly toward and away from each other. In this way, the picker heads can be spaced at whatever distance they can operate most effectively upon the beans at the opposite side of the bean plants in a row thereof, such as row 72 (FIG. 1) which is formed on a fence or trellis provided by wires strung between a plurality of end posts 88 and intermediate posts 90. The picker heads 62 and 64 and related structures are similar to each other. Therefore, only the right hand picker head 62 and related supporting and adjusting apparatus, shown best in FIGS. 4–15 will be described in detail. Parts of the left hand picker head 64 and apparatus relating thereto will be given reference numbers identical to those used in identifying corresponding parts of the right hand picker head 62 but, in addition, will be given a prime suffix mark.

The picker heads 62 and 64 have foliage lifting devices 74 and 74', respectively (FIGS. 1 and 2), adjacent their front ends which raise the foliage to expose the beans to a plurality of picker bar assemblies 78 and 78', respectively, which are moved upward in contact with the opposite sides of the plants in a row to pick the beans. Beans, which are picked by the upwardly moving picker bar assemblies 78 and 78', drop downwardly and are received by conveyor systems 80 and 82 associated with the picker heads 62 and 64, respectively. The beans are delivered by the conveyors 80 and 82 into large bags 84 (shown in full lines in FIG. 1 and in phantom lines in FIG. 3) are carried by the harvester 30 adjacent its rear end. As will be explained presently, a drive mechanism 86 is provided to connect the motor 48 with the picker heads 62 and 64 and with the conveyor systems 80 and 82 to drive the same.

At the start of bean harvesting operation, the picker heads 62 and 64 are in a raised, transporting position (not shown). After the harvester is moved into longitudinal alignment with one row 72 of bean plants (FIG. 1), the picker heads are lowered into harvesting position (shown in FIGS. 1 and 2) and the spacing of the picker heads 62 and 64 with respect to each other is adjusted in accordance with the general thickness of the row. Thereafter, the foliage lifting devices 74 and 74', the picker heads 62 and 64 and the conveyor systems 80 and 82 are set in operation, and the harvester 30 advanced in the direction indicated by the arrow 58 (FIG. 1), with the picker heads 62 and 64 astride the row 72 of bean plants. If the end posts 88 of the row 72 are very large in cross section, the harvester 30 is first moved past the post 88 at the beginning of the row while the picker heads 62 and 64 are widely spaced apart. The progress of the harvester is then halted and the picker heads 62 and 64 moved toward each other into suitably spaced relation after which the harvesting operation proceeds as described above. It will be understood that the posts 90 of the rows 72, intermediate the end posts 88, are in general more slender than the end posts 88 and do not obstruct progress of the harvester along the rows. During movement of the harvester 30 along the row 72, the picker bar assemblies 78 and 78′ effectively pick the beans within the range of sizes stated previously. The beans, picked by the action of the picker heads 62 and 64, fall upon or are directed downwardly to the conveyor systems 80 and 82. The bags 84, after being filled with beans, are removed from the harvester 30 and exchanged for empty bags or are emptied and replaced.

Picker heads

The picker head 62 (FIG. 5) includes a vertically elongate, rectangular frame 92 defined, in general, by four upright corner posts 94, 96, 98, and 100 (FIG. 8). The posts 96 and 98 are connected by a plurality of horizontal tie bars 102 (FIGS. 6A and 6B) which, in conjunction with these posts, form the rear wall 104 of the picker head 62. The posts 94 and 100 are similarly connected by horizontal tie bars 106 to form the forward wall 108 of the picker head 62. The walls 104 and 108 are held in rigid, horizontally spaced apart relation at their top ends by inner and outer bars 110 and 112, respectively, (FIGS. 6A and 7), extending longitudinally of the harvester 30 between the posts 94 and 96, and 98 and 100, respectively. An inverted channel 114 (FIG. 7) extends longitudinally through the center of the frame 92 and is secured at one end to one of the transverse tie bars 102 and at its other end to a tie bar 106. Similarly, a channel 116 (FIG. 6B) extends centrally through the machine between associated tie bars 102 and 106. The channel beams 114 and 116 project outward from the picker head beyond the walls 104 and 108. It will be understood that the end walls 104 and 108, the interconnecting bars 110 and 112 and the beams 114 and 116 form the rigid rectangular frame 92 of the picker head 62.

An endless conveyor 126 (FIG. 7) is mounted in the picker head 62 and is provided with inner and outer vertically extending reaches 128 and 130. The conveyor 126 includes two horizontally spaced, endless chains 132 that are trained around upper and lower vertically spaced sprockets 134 and 136, respectively, which are fixed to horizontal shafts 138 and 140, respectively.

An endless series of the previously mentioned picker bar assemblies 78 are secured in equally spaced relation between the two spaced chains 132. The upper shaft 138 is a drive shaft and is journalled in bearings 142 and 144 fixed to the opposite end walls 104 and 108, respectively, with the end portions of the shaft projecting outward from the frame 92 beyond the end walls. The lower or idler shaft 140 (FIG. 6B) is journalled in bearings 146 and 148, secured to the walls 104 and 108, respectively, for vertical adjustment, in a well known manner, to vary the tension of the chains 132. It will be noted (FIGS. 6B and 8) that the front end portion only of the shaft 140 projects outward from the frame 92 beyond the end wall 108. The rearwardly projecting end portion of the drive shaft 138 is connected to the drive mechanism of the machine, in a manner to be described later, to operate the conveyor 126 and thereby move the picker bar assemblies 78 on the inner reach 128 upward, as indicated by the arrow 150 (FIG. 7).

Vertical bars 151 which are secured to the beams 114 and 116 between aligned sprockets 134 and 136 are engaged by the reaches 128 and 130 and provide guide tracks therefor.

Since the picker bar assemblies 78 of the endless conveyor 126, are similar to each other, the following description will be directed to but one of the assemblies 78A shown best in FIG. 8. The picker bar assembly 78A comprises a curved picker bar 152 which is mounted, in a manner to be described presently, on three brackets 161, 162, and 163 that are supported on a rod 158 which is carried by the spaced conveyor chains 132. As seen in FIG. 9 each end of the mounting rod 158 is journalled in a cylindrical bearing sleeve 160 which has a plate 160a secured to special links 132a of the chains 132.

The three brackets 161, 162, and 163 of the picker bar assembly 78 cooperate with the rod 158 to provide a picker bar carrier. Each bracket (FIG. 9) is of modified U-shape and comprises an elongate body 164 and two spaced legs 166 which project from one side of the body 164 and are provided with aligned apertures 168 (only one shown, FIG. 9) to receive the rod 158. The legs 166 of each of the endmost brackets 161 and 163 are on opposite sides of the associated mounting sleeve 160 and abut its opposite ends. An elongate arm 170, later to be described, projects from the other side of the body 164 in a direction opposite to that of the legs 166.

The brackets 161 and 163 are arranged on the rod 158 with the arms 170 in angular alignment and are rigidly interconnected by a U-shaped bar or torque transmitting member 174 (FIG. 8) having its opposite ends fixed to the free ends of the inner legs 166. The bight portion 176 of the bar 174 extends in spaced parallel relation to the rod 158 on the side thereof opposite the bracket bodies 164. Centrally of the bight portion 176 and adjacent bracket 162 is a rigid projection 178 which includes a collar 180 (FIG. 8), mounted in fixed position on the rod 158 by a set screw 182. The brackets 161 and 163 are fixed by set screws 183, (FIG. 9), to the shaft 158 for pivotal movement therewith upon rotation of the shaft 158 in its opposite bearings 160. This arrangement assures that neither of the brackets 161 and 163 can be moved angularly about the mounting rod 158 with respect to the other.

The third or center bracket 162 is not keyed to the rod 158 and has its legs 166 astride the projection 178 (FIG. 8). Movement of the center bracket 162 axially of the rod 158 in one direction is prevented by a spacer sleeve 184 thereon extending between and engaging the projection 178 and the rearmost leg 166. Movement of the bracket 162 in the other direction is prevented by a collar 186 which engages the rear of the forward leg 166 and is fixed to the rod 158 by a set screw 188. This manner of mounting the center bracket 162 enables it to pivot on the rod 158 with respect to the associated end brackets 161 and 163.

To limit pivotal movement of the brackets 161 and 163 in one direction, horizontally aligned abutment stops 190 (FIG. 9) are fixed to the sleeves 160 so as to project transversely therefrom at one side of and beyond the associated bracket body 164. For a reason to be made apparent later, a torsion spring 192, coiled about an end portion of each mounting sleeve 160, has its opposite ends connected to the rear bracket leg 166 and to the associated abutment stop 190, respectively. Another torsion spring 192 (FIG. 8), associated with the center bracket 162, is coiled about the sleeve 184 and has its ends connected to the adjacent bracket leg 166 and to the projection 178, respectively. An abutment stop 194 (FIG. 8) on the projection 178 is horizontally aligned with the abutment stops 190 when the brackets 161 and 163 are in engagement with the latter and projects transversely of the rod 158 to a position overlying the body 164 of the center bracket 162. When the picker bar assemblies 78 move along the inner reach of the conveyor 126, the abutment stops 190 and 194 overlie the brackets 161, 162 and 163, which are resiliently urged upward by the torsion springs 192 so that the bodies 164 engage the aligned abutment stops. Thus, the abutment stops limit upward movement of the associated picker bar assembly 78 at a position wherein the arms 170 project at right angles to the inner reach 128 (FIG. 9).

Each of the three arms 170 has a sleeve portion provided with a longitudinal socket 196 (FIG. 9) which receives a tang or mounting arm 197 of the curved picker bar. A slot 198 extending across the upper edge of each arm 170 opens into the associated socket 196 and is disposed parallel to the mounting rod 158.

As shown in FIG. 9, a quick release latch 200 on each arm 170 includes a key or detent 202 removably received in the slot 198. Each latch 200 comprises, in addition to the detent 202, a rectangular band 204 which extends around the arm 170 and has side walls 210 and relatively short upper and lower walls 206 and 208 which are slightly greater in length than the shorter transverse dimension of the arm 170. The detent 202 is fixed in a slot 206a in the upper wall 206 of the band 204 and projects down into the band a distance substantially equal to the depth of the slot 198. Opposite end portions 212 of the detent 202 project beyond the opposite sides 210 of the band 204. The length of the sides 210 is greater than the longer transverse dimension of the arm 170 and therefore permits movement of the bank 204 transversely of the arm 170 (upward and downward, FIG. 9) sufficiently to move the detent 202 into and out of the slot 198.

A cap 214, located within the opening defined by the band 204, is fixed on the upwardly projecting shank end of an adjusting screw 216 threaded through the bottom wall 208 of the band 204. A compression spring 218 interposed between and reacting on both the cap 214 and the adjacent side of the arm 170 urges the band 204 downward, FIG. 9, to removably retain the detent 202 in the slot 198. By turning the screw 216, the cap 214 may be moved up or down to adjust the force of the spring 218 to a valve sufficient to effectively retain the detent 202 in the slot 198. The latch 200 can easily be removed from the operative position shown in FIG. 9 to the inoperative position (not shown) by engaging the opposite projecting end portions 212 of the detent 202 and moving the latch 200 upward (FIG. 9) against the force of the spring 218 to remove the detent 202 from the slot 198.

Another arm 220 (FIG. 9) on the bracket 161 projects from the body 164 at a point adjacent the outer leg 166 and in parallel relation to the arm 170. A cam follower roller 222, mounted for rotation on the arm 220, controls pivotal movement of the picker bar assembly 78 during movement of the conveyor 126, in a manner to be fully disclosed later.

Two of the bean stripping picker bars, which actually engage and pick the beans from the plant rows 72, are shown in FIG. 11 removed from the picker heads 62 and 64. The bar 152 is associated with the right hand picker head 62 while bar 152' is associated with the left hand head 64. In FIG. 11, the ends of the bars near the bottom of the view are those at the front of the machine and are indicated by reference numerals 152F and 152F'. It will be apparent that the picker bars are similar and are symmetrical about the longitudinal center of the harvester 30, indicated by the center line 226 (FIG. 11). The following description will be directed to only one of the several picker bars used in the picker head 62.

Each picker bar comprises an elongate bean engaging rod of circular cross section. The rod has small curves or undulations 232 throughout its length. In addition, the rod has approximately four large, primary undulations 230. It is to be noted that, in this embodiment of the picker bars, the undulations 230 and 232 lie in the same plane.

Each bar carries three of the previously mentioned tangs or shanks by which the bar 152 is mounted in the brackets 161, 162 and 163, and these tangs are located at and fixed to the opposite ends and adjacent the center, respectively, of the rod and project in a common direction therefrom, in the plane of the corrugations 230 and 232. The primary corrugations 230 provide the side of the rod opposite the tangs 197 with a plurality of alternate crests 236 and hollows 238. A picker bar four feet long and one-fourth inch in diameter has been found to function efficiently to pick beans of a size and under the conditions mentioned when the primary undulations 230 vary from approximately twenty or twenty-one inches in length with an amplitude of three inches, adjacent the front end, to approximately sixteen inches in length with an amplitude of two inches, adjacent the rear end. The secondary undulations 232 are uniform and are one and one-half inches long with an amplitude of one-fourth inch.

The endmost tangs or legs 197 are fixed to opposite ends of the bar 152, the tang at the rear end 152R being disposed substantially at the center of a crest 236, and the tang at the front end 152F being at the center of a hollow 238. The precise location of the third or middle tang 197 is not critical providing it is secured to the bar approximately midway between the other tangs. Each tang 197 is of rectangular cross section to fit in the socket 196 of the associated bracket and, as viewed in FIG. 11, has a groove 240 across its upper edge. The grooves 240 in the three tangs 197 are aligned longitudinally of the picking bar 152 in equally spaced relation to the crests 236 (FIG. 11). A portion 152a of the picker bar adjacent the forward ends 152F and between the adjacent crest 236 and the front tang 197, is directed laterally and provides the bar with an oblique deflector 242. It will be understood from FIGS. 9 and 11 that, when the tangs 197 are provided with grooves 240 in both their upper and lower edges the picker bars may be interchanged from one picker head 62 or 64 to the other.

In order to mount a picker bar 152, the three tangs 197 thereof are inserted in the sockets 196 in the arms 170 of the three brackets 161–163. The latches 200 are then moved against the force of the springs 218 to retract the detents 202 from the slots 198, thus, enabling the tangs to be moved into the sockets 196 until the grooves 240 are in registry with the detents 202. The latches 200 are then released, the detents 202 enter the slots 198 and the grooves 240, and removably lock the picker bar in operative position in the carrier provided by the brackets 161–163. In this way, the picker bar 152 of each picker bar assembly 78 is disposed with the crests 236 in a plane parallel to the rod 158. Thus, it will be clear that when the picker bars 152 and 152' are along the inner reaches 128 and 128' of the conveyors 126 and 126', respectively, the picker bars move in vertical paths. Throughout the length of opposite picker bars 152 and 152' the crests 236 and 236' are equally spaced from a vertical longitudinal median plane of the harvester. The spacing between the opposite hollows 238 and 238', however, diminishes progressively from the front to the rear of the harvester. It will be apparent that the latches 200 and 200' of the picker bar assemblies 78 and 78' enable quick removal and replacement of the picker bars 152 and 152', respectively.

During bean harvesting operations the picker bars 152 and 152' are carried upward, in vertically staggered relation to each other, in engagement with the bean plants at the opposite sides of the row 72. The reaction on each picker bar assembly 78 and 78', as the picker bars 152 and 152' thereof drag against the bean plants, may pivot the assemblies downward in their mounting sleeves 160 against the urgency of the torsion springs 192. Any pivotal movement of either end bracket 161 or 163 of a picker bar assembly causes equal pivoting of the opposite end bracket due to the interconnecting bar 174. When in any position other than their normal position, shown by picker bar assembly 78B (FIG. 7) the endmost brackets 161 and 163 of an assembly 78 are out of engagement with their abutment stops 190, as shown by assembly 78C at the lower end of FIG. 7.

When the picker bar 152 and the associated bar 174 are pivoted downward with the end brackets 161 and 163, the central abutment stop 194 is also pivoted downward, and may remain in engagement with the body 164 of the center bracket 162. The center abutment stop 194, therefore, under certain operating conditions, pivots the center bracket 162 downward in conformity with the downward angular movement of the associated end brackets 161 and 163. The center return spring 192, by urging the center bracket 162 upward toward engagement with the abutment stop 194, aids the picker bar 152 in resisting downward pivotal movement during harvesting operations. However, the fact that the center bracket 162 can pivot independently of the associated end brackets 161 and 163, provides the bar 152 with certain needed flexibility.

While a particular picker bar 152 is in bean picking engagement with the row 72 and the entire picker bar assembly 78 is pivoted downward it may encounter an especially thick clump of bean vines. Since, under such conditions, the center portion of the bar can flex downward independently of the end portions, the bar 152 can conform more nearly to the contour of the plant row 72. In this way, bean picking engagement of the picking bar 152 with the plants of the row 72 is maintained even though the portion of the row concerned does not conform to the average, generally straight sides of the plant row.

The engagement of the picker bars 152 and 152', with the posts 88 and 90, during movement of the harvester along the plant rows 72, would permanently deform or break the bars if they could not flex and if each picker bar assembly 78 was not mounted to pivot in the manner described. While a picker bar is encountering a thick clump of bean vines or an unyielding post, it may be momentarily bent downward at its mid-portion. However, after the obstruction is passed, the rod is returned to its original alignment by the action of the center return spring 192 as it urges the associated bracket 162 upward into engagement with its abutment stop 194.

The picker bars 152 are retracted (FIG. 7) from their outwardly projecting position while being carried by the conveyor 126 over the upper sprockets 134, and the speed of the picker bars 152, is retarded when they are adjacent the lower sprockets 136 prior to and during their entry into the inner reach 128. To accomplish this operation, the cam follower rollers 222 of the bar assemblies 78 are engageable with upper and lower cams 262 and 264 on the rectangular frame 92.

The upper cam 262 (FIG. 7) comprises rigid inner and outer track parts 265 and 266, respectively, mounted in the path of the rollers 222 by laterally projecting arms 268, fixed to the forward wall 108 (FIG. 6A). The inner cam part 265 is first engaged by the rollers 222 when the rollers are adjacent the top of the inner reach 128. The cam part 265 includes an upwardly and outwardly curved portion 270 which begins at a point horizontally opposite the shaft 138. The curved portion 270 extends above the top of the conveyor 126 and ends vertically above the shaft 138. The inner cam part 265 merges with the outer part 266, which curves downward to a straight portion 272 that diverges outward from the conveyor. The curved portion 270 is arranged to progressively retract the picker bar assemblies 78 by pivoting the same in their bearings 160.

As the picker bar conveyor 126 advances in the direction indicated by the arrow 150 (FIG. 7) the picker bar assemblies 78 are retracted from their fully projected position, shown by assembly 78B in FIG. 7, to their fully retracted position shown at the left by assembly 78D. Thus, the height to which the picker bars 152 will project while passing over the sprockets 134 is limited. For this reason, the tie bars 110 and 112, at the top of the picker head 62, can be relatively close to the sprockets 134 so that the picker head 62 is shorter than would otherwise be possible. As the picker bar assemblies 78 descend from the fully retracted position they are progressively pivoted outward by the torsion springs 192 so as to be fully projected at the time the rollers 222 are at the lower end (FIG. 20) of the cam portion 272.

It will be understood that the height to which the picker bar assemblies 78 and 78' normally ascend the reaches 128 and 128' corresponds closely to the greatest height to which beans grow on the plants of the row. As the assemblies 78 and 78' progress around the upper sprockets 134 and 134' the picker bars 152 and 152' are withdrawn from engagement with the opposite sides of the row 72. Thus, it will be clear that when the picker bar assemblies 78 and 78' travel upward along the reaches 128 and 128', the picker bars 152 and 152' are normally effective to pick beans from the row 72 throughout its entire height. It will be apparent, however, that the height to which the picker bars 152 and 152' ascend while in engagement with the row 72, i.e., the height to which the picker bars 152 and 152' are effective to pick beans, can be controlled by substituting different cam parts of greater length and of somewhat different configuration for the inner cam part 265.

As shown in FIG. 10, a longer cam part 265a may be substituted in the picker head 62 for the cam part 265. In the cam part 265a, the end of the curved portion 270a adjacent the sprocket 134, first engaged by the rollers 222, lies closer to the chain 132 than does the corresponding end of the curved portion 270, shown in FIG. 7. The lower end of an elongate straight portion 271, extending substantially vertically downward from the curved portion 270a, is curved inward of the harvester and downward, as at 273 (FIG. 10), to guide the ascending rollers 222 onto the straight portion 271. Thus, the straight portion 271, when first engaged by the rollers 222, retracts the associated picker bar assemblies 78 to remove their picker bars 152 from bean picking engagement with the side of the plant row 72. In this way, the picker bar assemblies 78 are retracted by the cam part 265a before reaching the top of the reach 128, and, consequently, before reaching the top of the row 72. Thereafter, during further upward movement of the assemblies 78, the picker bars 152 are ineffective to pick beans from the upper portion of the row 72. Cam parts 265a having straight portions 271 of different lengths can be provided which will be engaged by the follower rollers 222 and retract the picker bar assemblies 78 at any height at which it may be desired to stop the picking operation, as will be more fully described hereinafter.

The lower cam 264 (FIG. 7) comprises a curved track, mounted in the path of the rollers 222 by laterally projecting arms 274 fixed to the forward wall 108 (FIGS. 6B and 8). The cam 264 has a uniformly-curved inner camming surface that is so spaced from the shaft 140 that each picker bar assembly assumes the partially retracted position in which assembly 78C is shown. With this arrangement, when each bar moves into the inner reach of the conveyor, its periperal speed is less than it would be if the assembly were fully projected. Therefore, no whip-like engagement of the picker bars 152 with the bean plants will occur, and damage to the vines, the blossoms and the beans is prevented.

Protective guards 280 and 280' (only the guard 280, FIGS. 7 and 8 being shown in detail) are provided on the picker heads 62 and 64, to protect the picker head mechanisms, as well as attending personnel, from injury. The guard 280 comprises a box-like enclosure 282 having front and rear ends 284 and 286, respectively, extending outward from the rectangular frame 92. An outer side 288 of the enclosure 282, interconnecting the ends 284 and 286 is arranged to clear the picker bar assemblies 78 descending the outer reach 130. The top and bottom 290 and 292 of the enclosure 282 are of sheet material, and the bottom is inclined downward toward the bottom of the rectangular frame 92. The bottom 292, therefore, directs any beans falling thereon inwardly of the picker head 62, as will become clear hereinafter. The enclosure 282 is rigidly attached to a framework of structural members 294 secured to the corner posts 98 and 100 to mount the protective guard 280 on the rectangular frame 92. A channel 296, extending longitudinally of the machine 30 adjacent the bottom 292, is secured to both the side 288 of the enclosure and to the frame work 294 for use in raising and lowering the picker head 62, as will be described later.

Foliage lifting device

The foliage lifting devices 74 and 74' (FIGS. 1 and 2), consist in general of two endless chain conveyors 358 and 358' that are mounted at the forward end of the machine, one conveyor being mounted on each of the picking heads 62 and 64 for lifting the foliage to expose the beans to the picker bars. The lifting device 74 associated with head 62 will be described in detail. As seen in FIGS. 6A–6B, the device 74 includes a conveyor 358 having two endless chains 360, trained about compound sprockets 362 and 364 which are rotatable on the forward end portions of the upper and lower shafts 138 and 140, respectively. The sprockets 362 and 364 are vertically spaced and are retained against movement along the shafts 138 and 140 by a pair of set collars 366, respectively, fixed thereto. The chains 360 are spaced apart longitudinally of the machine 30, with their inner reaches 368 (FIG. 8) in substantial alignment with the inner reach 128 of the picker bar conveyor 126. The conveyor 358 carries an endless series of paddles 370 which are pivoted on the chains 360 at approximately eight inch intervals. The construction of only one paddle 370 will be described in detail since all of the paddles are similar.

Each paddle 370 comprises an elongate tongue or flap 372 of moderately flexible belting or comparable material, having a width similar to that of the conveyor 358. When in the inner reach of the conveyor, the flap 372 extends transversely of the machine 30 and has one end (FIG. 14) bolted to the inwardly directed legs 374 of opposite parallel angle members 376 of a mounting bracket 378. The angle members 376 extend longitudinally of the flap 372 and project from an angle bar 380 (FIG. 13) which extends at right angles to the members 376. The angle bar 380 has one leg 382 fixed to the adjacent ends of the legs 374 and one leg 384 directed upward (FIGS. 13 and 14) away from the legs 374. Other legs 386 of the members 376 extending along the outer edges thereof, are directed downward (FIGS. 13 and 14) away from the angle bar 380 and the flap 372.

The mounting bracket 378 (FIG. 13) straddles the conveyor 358 with the opposite legs 386 being locate at the outer ends of axially aligned and spaced sleeve bearings 388 which are fixed to inwardly projecting tabs 389a formed on laterally aligned links 389 of the chains 360. A pin 390 having a head 390a at one end and projecting through the legs 386, the bearings 388, and a spacer sleeve 391 between the bearings 388, mounts the paddle 370 for pivotal movement on the conveyor 358. Removal of the shaft 390 is prevented by a cotter pin 392 extending through the other end of the pin 390 and a laterally projecting end portion of the leg 382. One end portion 394 of a torsion spring 396 (FIG. 13) coiled about the spacer sleeve 391, is disposed in an opening in the adjacent tag 389a of the link 389 at one side of the conveyor 358 and the other end 400 of the spring engages the leg 374 of the paddle 370 at the other side of the conveyor. Reaction of the spring 396 urges the paddle 370 toward a position wherein the bracket leg 384 (FIG. 14) engages the conveyor chains 360. Thus, as shown in FIGS. 6A, 6B, and 13, the paddles 370 in the inner reach 368 of the conveyor 358 are urged upward toward a position wherein the angle members 376 project at right angles to the reach. When the paddles 370 are so positioned the flaps 372 droop toward the longitudinal center of the machine 30.

As shown best in FIGS. 6B, 8, and 19, the conveyor 358 is driven by the shaft 140 through a power train 410 to move the paddles 370 of the inner reach 368 upward at substantially the same speed as that of the picker head conveyor 126. The power train 410 comprises a chain and sprocket arrangement 412 interconnecting the idler shaft 140 of the picker bar conveyor and a counter shaft 414. The counter shaft 414, which is parallel to the idler shaft 140, is journalled in a bearing 416 secured to the end wall 108 and projects forward therefrom between the inner and outer flights of the adjacent chain 360. A chain and sprocket arrangement 418 connected to the compound sprocket 364 between the chains 360 connects the counter shaft 414 to the conveyor 358.

During operation of the picker heads 62 and 64 the paddles 370 and 370' are disposed substantially opposite each other and are moved upward by the conveyor 358 and 358', respectively, to lift the foliage, including leaves and drooping vine ends, to expose the beans to the action of the picker bars as the harvester 30 is advanced along the row 72. In the event the foliage is of such character that use of the foliage lifting devices 74 and 74' is not necessary to the harvesting operation, the power trains 410 and 410' can be disconnected.

Picker head mounting structure

Since the mounting structures 66 and 66', by which the picker heads 62 and 64 are individually connected to the frame 34 in a manner enabling vertical, as well as horizontal adjustment, are similar to each other, only the mounting structure 66 associated with the picker head 62 will be described in detail. As shown best in FIG. 5, this mounting structure comprises vertical rear and front mounting shafts 432 and 430, respectively. The front shaft 430 is mounted for rotation in fixed position in upper and lower brackets 434 and 436, respectively, which are rigid with the chassis 32.

Upper and lower links 438 and 440 for adjustably attaching the front of the picker head 62 to the shaft 430 are connected at their rear ends for universal pivoting movement to the projecting front ends of the upper and lower bears 114 and 116 by universal couplings 442, respectively, of common construction. The front ends of the links 438 and 440 are hinged for vertical pivoting movement to brackets 444, which are fixed to the rotatable shaft 430 adjacent the front ends of the beams 114 and 116, respectively.

In a similar manner, upper and lower links 446 and 448 adjustably attach the rear of the picker head 62 to the shaft 432. The links 446 and 448 are connected for universal pivoting movement at their front ends to the projecting rear ends of the upper and lower beams 114 and 116 by universal couplings 450 similar to the couplings 442. The rear ends of the links 446 and 448 are hinged for vertical pivoting movement to brackets 452 which are fixed to the rear shaft 432 adjacent the rear ends of the beams 114 and 116, respectively.

The rear shaft 432 is mounted for rotation about its own axis and for sliding movement longitudinally of the frame structure 34 in a direction parallel to the side portion 40. Accordingly, the lower end of the shaft 432 (FIGS. 4, 5, 12, and 16) is rotatable in a bearing 454 fixed to a rectangular plate 456. The plate 456 (FIG. 12) is mounted for horizontal sliding movement upon a planar surface 458 of a mounting bracket 460 which is rigid with and projects inward of the chassis from the side portion 40. Opposite guides 462, fixed to the surface 458 of the bracket 460, guide the plate 456 for sliding movement on the surface 458 longitudinally of the machine 30 between front and rear sides 464. A semi-cylindrical boss 465 on the shaft 432 adjacent its lower end has upper and lower, semi-circular radial shoulders 466 and 467, respectively. The lower shoulder 467 rests upon a rotatable bearing sleeve 454a into which the lower end of the shaft 432 is inserted to mount the shaft for rotation in the bearing 454.

The upper shoulder 466 is slidably engaged with the lower surface of a shaft-retaining bar 468 which is fixed to the front and rear sides 464 of the bracket 460 in parallel relation to the surface 458. For this reason, the shaft 432 can be shifted longitudinally of the machine and rotated to a limited extent about its own axis while being retained against accidental removal from the bracket 460. It will be noted, however, that when the shaft 432 is disconnected from the links 446 and 448 it can be rotated through approximately 180° from the position shown in FIG. 12 to remove the shoulder 466 from beneath the bar 468, thereby enabling easy withdrawal of the shaft 432 from the bearing 454.

As shown best in FIGS. 5 and 16, the shaft 432 is guided adjacent its upper end by opposite bars 470 for sliding movement longitudinally of the machine 30. The guide bars 470 are rigid with the frame structure 34 and project longitudinally of the machine 30 in engagement with the opposite sides of the shaft 432.

Tension springs 472 (FIG. 5), located adajcent the front and rear of the picker head 62, are connected at their lower ends by short eye bolts 474 fixed to the beam 116, inwardly from the universal couplings 442 and 450, respectively. The upper ends of the springs 472 are connected to long eye bolts 476 (FIG. 6A) which extend downward through tabs 478 on the upper brackets 444 and 452, respectively. Nuts 480, threaded onto the upper ends of the long eye bolts 476 above and below the tabs 478, are used to adjust the position of the eye bolts 476 axially with respect to the brackets 444 and 452, for varying the tension of the springs 472. By appropriately adjusting the tension of the springs 472 the weight of the picker head 62 can be substantially counterbalanced by the springs. Thus, it will be apparent that the picker heads 62 and 64, which are mounted opposite each other in confronting relation by the mounting structure 66 and 66', may have their positions adjusted vertically or horizontally while their weight is substantially counterbalanced by the springs 472 and 472', respectively.

Height adjusting apparatus

The height adjusting apparatus 68 (FIGS. 1 and 15) comprises a double acting hydraulic cylinder 490 of conventional design, mounted in fixed upright position on the horizontal frame portion 36, above the outer side of the picker head 64. Fixed to the upper end of the upwardly projecting plunger 492 of the cylinder 490 is a horizontal crosshead 494 extending transversely of the machine 30. A cable 496 (FIG. 15), which is secured at its upper end to the inner end of the crosshead 494 extends downward therefrom to a first pulley 498 which is rotatable on one of the transverse beams 38. The cable 496 is trained beneath the pulley 498 and over another pulley 500, located above the outer side of the picker head 62 adjacent its center longitudinally of the harvester 30 on the same beam 38. The cable 496 extends downward from the pulley 500 and is attached at its lower end to a connecting lug 502 (FIG. 5) having a pin 504 projecting therefrom. The pin 504 interconnects the upper ends of two diverging straps 506 of equal length which are bolted or otherwise connected at their other ends to the opposite ends of the channel 296 near the bottom of the picker head 62.

The other cable 496' is connected to the outer end of the crosshead 494 (FIG. 15) and extends downward therefrom to the connecting lug 502' (FIG. 4). It will be clear that the lug 502' is attached to two straps 506' of equal length by a pin 504', the straps being secured to the channel 296' of the picker head 64 in the manner described in connection with the straps 506 of the picker head 62.

Two hydraulic lines L1 and L2 (FIG. 15) of a hydraulic system, which includes a pump and controls (not shown) of common design, lead to the double acting cylinder 490. Upon manipulation of the controls, the cylinder can be operated to raise the picker heads 62 and 64 from the lowered operating position (FIG. 15) to a transport position (not shown) or to any intermediate position. In this way, the uncounterbalanced weight of the picker heads 62 and 64 is supported by the cables 496 and 496' of the height adjusting apparatus 68 so that the position of the picker heads with respect to the ground can be selected no matter whether the machine 30 is being transported from place to place or is operating in performance of a harvesting operation. Thus, when the picker heads 62 and 64 are close to the ground to assure gather beans from the bottoms of the plants, and a rise of ground or other similar obstruction is forcibly encountered by one or both picker heads, the picker heads will easily yield upward individually to clear the obstruction. Thereafter, the picker heads return to their former position, determined by the height adjusting apparatus 68. For this reason, it may be said that, during harvesting operations, the picker heads "float" just above the ground. Consequently, damage, that would be inflicted upon rigidly positioned picker heads, is avoided in the present harvest machine 30.

Horizontal adjusting device

The horizontal adjusting device 70 (FIGS. 4 and 5) by which the positions of the picker heads 62 and 64 are adjusted horizontally to vary the space there-between comprises a compound parallelogram linkage system 520, actuated by a double acting hydraulic cylinder 522. The linkage system includes an actuating bar 524 which extends longitudinally of the harvester 30 midway between the side portions 40 and 42. Two similar links 526, which are pivoted at their outer ends on the bar 112 adjacent the front and rear ends, respectively, of the picker head 62, are pivoted at their inner ends on the actuating bar 524 at equally spaced locations. Similar links 526' are pivoted on the bar 112' of the picker head 64 and on the actuating bar 524 at locations corresponding to those at which the links 526 are pivoted.

The actuating bar 524 has lateral extensions 528 and 528' overlying the picker heads 62 and 64 which are held by longitudinal guide rods 530 and 530' on the bars 110 and 110', respectively, for sliding movement therealong. In this way, it is assured that the linkage system 520, while effective to move the picker heads toward and from each other, will be carried by the picker heads during vertical adjustment.

The actuating bar 524 is guided, adjacent opposite ends, for lengthwise movement longitudinally of the harvester by transversely opposite guides 532, which are rigid with the appropriate ones of the transverse beams 38 and project vertically therebelow at opposite sides of the actuating bar 524. Therefore, regardless of what vertical position the picker heads may be in, the actuating bar 524 cannot move laterally. This assures that, when the actuating bar 524 is moved longitudinally, the positions of the picker heads will be adjusted horizontally.

The hydraulic cylinder 522 is pivotally attached by a bracket 534 to the front beam 38 for vertical swinging movement. A plunger 536, projecting from the inner end of the cylinder 522, is pivoted for vertical movement to a clevis 538. The clevis is pivotally attached to the front end of the actuating bar 524 with the links 526 and 526' for horizontal pivoting movement. This arrangement provides a flexible connection of the cylinder 522 to both the frame structure 34 and the actuating bar 524.

The hydraulic lines L3 and L4 (FIG. 5) of a hydraulic system, which includes a pump and controls (not shown) of common design lead to the double acting cylinder 522. Upon manipulation of the controls, the cylinder can be operated to move the actuating bar 524 longitudinally forward or rearward. In this way, the picker heads 62 and 64 are moved equal distances toward or from each other due to the connection of the links 526 and 526' to the bar 524 to the picker heads 62 and 64, respectively.

Conveyor systems

The conveyor systems 80 and 82 (FIGS. 2 and 3) which receive the beans, as they drop downwardly from the picker bars, and deliver the beans to the bags 84, are similar to each other, therefore, only the right hand conveyor system 80 will be described in detail. Parts of the left hand conveyor system 82, corresponding to those of the conveyor system 80, will be given corresponding reference numerals but with a prime suffix added.

Included in the conveyor system 80 is a primary or receiving conveyor 550 (FIG. 6B) extending beneath and carried by the picker head 62, which receives picked beans and advances them rearward to a secondary conveyor or elevator 552. The elevator 552 is carried by the frame structure 34 and transfers beans from the receiving conveyor 550 to the previously mentioned bag 84, associated with the conveyor system 80.

The receiving conveyor 550, which is shown throughout substantially its entire length in related FIGS. 6B and 16 and in transverse section in FIG. 7, comprises an elongated, trough-like housing 554 of channel-shaped cross section. This housing extends beneath the frame 92 and projects beyond both the front and rear ends thereof. The outer side flange 556 (FIG. 7) of the housing 554 extends beneath the corner posts 98 and 100 of the frame 92 to which the flange 556 is rigidly secured by straps 558 (only one of which is shown). The inner flange 560 of the housing 554 is located inwardly of the harvester with respect to the corner posts 94 and 96 (FIG. 7) and is rigidly secured to these posts by straps 562 (FIGS. 6B, 7 and 8). The leading end portion 564 (FIG. 6B) of the housing 554 is angled upward and forward with respect to the remainder of the housing, which, in general, extends horizontally. The bottom wall 566 (FIGS. 7 and 16) of the housing 554 is of such configuration throughout its length and is so disposed beneath the frame 92 as to function as a runner for the picker head 62, during advancement of the same close to the ground. Thus, when the picker head is in picking position and the bottom 566 strikes the ground, the picker head is deflected upward. In addition, the bottom 566 also serves as a shield and a support for other parts of the conveyor 550.

An endless conveyor belt 572 (FIGS. 6B and 16) is trained about a drive pulley 574 adjacent the front end of the housing 554, and an idler pulley 576 at the rear end. The drive pulley 574 is fixed to a shaft 578, journalled in bearings (not shown) on the opposite flanges 556 and 560 adjacent the leading end 564 of the housing. The idler pulley 576 has a shaft 580, journalled in bearings (not shown) on upwardly and rearwardly projecting extensions 582 (only one shown, FIGS. 16 and 18) of the side flanges 556 and 560, respectively. The idler pulley 576 is, thus, spaced above and rearward of the housing 554.

The lower reach 584 of the belt 572 is engaged beneath the idler rollers 586 and 588 (FIGS. 6B and 16), journalled in bearings (not shown) on the flanges 556 and 560, to hold the reach close to the bottom wall 566 of the housing as the reach passes beneath the picker head 62. The upper reach 590 of the belt 572 is engaged beneath an idler roller 592 journalled in bearings (not shown) on the side flanges 556 and 560 adjacent the front of the housing 554. This roller retains the forward portion of the reach 590 close to the lower reach 584 to conserve space.

Rearwardly of the picker head 62, a portion of the upper reach 590 is guided along an upward and rearward incline in opposite tracks 594 (FIGS. 7 and 16) extending from a height similar to that of the idler roller 592 to a location near the main idler roller 576. Each guide track 594 comprises upper and lower rails 596 and 598, respectively, (FIG. 16), which are spaced apart so as to engage the upper and lower edge portions, respectively, at one side of the belt 572. A plurality of brackets 600, fixed to each guide track 594 and to the associated side flange 556 or 560 and the extensions 582 thereof, mount the tracks in operative position rearwardly of the picker head. The inclined portion 602 of the upper reach 590 raises beans thereon from the level of the upper reach extending beneath the picker head to a height at which the beans are fed by the receiving conveyor 550 to the elevator 552. Since the upper and lower reaches 584 and 590, respectively, extending beneath the picker head 62, are close to each other, the conveyor 126 carrying the picker bar assemblies 78 may be brought closer to the ground than would otherwise be possible. This enables the picker bar assemblies 78 to commence their picking operation low enough on the bean plants to pick the lowest growing beans.

A belt tensioner 606 (FIGS. 16 and 18) engages the lower reach 584 between the main idler roller 576 and the idler roller 588. The tensioner 606 includes a roller 608 having a shaft 610 journalled in opposite arms 612, respectively (only one shown), projecting in fixed parallel relation from a fulcrum shaft 614. The fulcrum shaft 614 is rotatable in the uperwardly inclined extensions of the side flanges of the conveyor housing and has one end projecting through one of the extensions 582, as shown in FIG. 18. An arm 616, fixed to the shaft 614, is in effect, an extension of the adjacent arm 612 and in conjunction therewith provides a lever, which is pivoted about the axis of the shaft 614 to move the roller 608 into engagement with the lower reach 584 of the belt 572. A tension spring 618, stretched between the upper end of the arm 616 and an upstanding arm 620 projecting upward from the extension 582, resiliently urges the roller 608 counterclockwise (FIG. 16) about the axis of the shaft 614 and against the belt 572 to hold the same under tension.

A wide, large diameter roller 626 (FIG. 6B), having a semifloating action, is mounted above the receiving conveyor 550 on the rear wall 104 of the picker head 62 above the reach 590, to aid in holding beans in engagement with the belt 572. For this reason, beans are more positively discharged from beneath the picker head than would otherwise be the case, and are aided in their initial ascent of the inclined portion 602. The roller 626 is freely rotatable on a shaft 628 projecting horizontally from a mounting arm 630, which is pivoted for vertical movement above the belt 572 on the wall 104. A tension spring 632 is stretched between the wall 104 and an upward projection 634 of the arm 630 to partly counterbalance the weight of the roller 626. An adjusting screw 636, which is threaded through a downward and lateral projection 638 (FIGS. 8 and 16) of the arm 630, limits downward movement of the roller 626 upon engagement of the screw with the corner post 98 (FIG. 8). When the adjusting screw 636 engages the corner post 98, the roller 626 contacts but does not depress the upper reach 590. Since the roller 626 has a semifloating action it yields upward when encountered by beans on the belt 572, yet effectively holds them against the belt, for the purpose mentioned, without bruising, crushing, or otherwise injuring the beans.

Part way up the inclined portion 602 of the upper reach 590 is a roller 644 (FIG. 16), which is similar in many respects to the roller 626. The roller 644 is freely rotatable on a shaft 646 projecting horizontally from a mounting arm 648, which is pivoted for vertical movement above the belt on a bracket 650 projecting inward from the side portion 40. A tension spring 652, stretched between the bracket 650 and an upward projection 654 of the arm 648, partly counterbalances the weight of the roller 644. An adjusting screw 656, threaded through a downward projection 658 of the arm 648, limits downward movement of the roller 644 upon engagement of the screw with the rear side 464 of the adjacent mounting bracket 460. The normal position of the roller 644 with respect to the belt 572 is similar to that described in connection with the roller 626. The roller 644 also has a semifloating action so that it will yield upward when encountered by beans on the inclined portion 602 of the belt 572. Nevertheless, the roller 644 effectively holds the beans against the belt to aid in their ascent of the inclined portion 602 yet avoids damage to the beans.

Picked beans falling onto the inclined bottom 292 of the protective guard 280 enclosing the outer side of the picker head 62 gravitate across a narrow flexible strip 660 (FIG. 7), which is inclined downwardly and inwardly of the picker head 62 and bridges the space between the inclined bottom 292 an dthe upper reach of the conveyor belt 572. The strip 660 extends the length of the picker head frame 92 and is bolted to the upper edge portion of the flange 556 at the outer side of the housing 554. Thus, the beans are supported by the strip 660 as they move from the bottom 292 onto the conveyor 550.

At the opposite side of the picker head 62 an apron 662 (FIGS. 7 and 8), which is wider and longer than the strip 660, is bolted to the upper edge portion of the side flange 560. The apron inclines upward and toward the opposite picker head from adjacent the inner edge of the conveyor belt 572. The apron may be made from belting having suitable resilience to maintain the inclination shown, or it may be made from a similar material supported by resilient strips of spring steel (not shown). The inner edge of the apron 662 is normally located substantially beneath the picker bars 152 when the same ascend the inner reach 128 of the picker head 62. Therefore beans, which have been picked by the action of the picker bars 152, fall upon the apron 662 and are directed thereby onto the conveyor belt 572 for delivery by the conveyor system 80 to the associated bag 84. Resiliency of the apron 662 permits it to flex as a result of engagement with the bean vines and posts 88 and 90. For this reason the apron yield when and where necessary, yet returns to the position shown in FIG. 7 so as to direct picked beans falling thereon, onto the conveyor belt 572.

The receiving conveyor 550 is driven by the lower shaft 140 of the picker head conveyor 126 through a power train 664, shown best in FIGS. 6B, 8, and 19. The power train 664 includes a chain and sprocket arrangement 666 interconnecting the shaft 140 of the picker bar conveyor, adjacent the front of the picker head 62, and the input shaft 670 of a right angle drive 672. A sprocket and chain arrangement 674 drivingly interconnects the output shaft 676 of the drive 672 and the shaft 578 of the drive roller 574 which drives the belt 572. Thus, the receiving conveyor 550, which is movable horizontally and vertically with the picker head 62 and is operated by the picker head conveyor 126, advances picked beans thereon toward the rear of the machine to the elevator 552.

It will be noted that the belt 572 is driven by the roller 574 at the forward end of the conveyor 550 rather than by the roller 576 at the discharge end of the conveyor, which is usually the case, and that the belt 572 is maintained under resilient tension by the belt tensioner 606. This enables the upper reach 590, when weighted by a mass of beans, to readily yield downward to a position close to the lower reach 584. Therefore, the conveyor 550 accommodates large masses of beans yet requires little height below the picker head, thereby enabling the picker bar assemblies 78 to start their picking operation close to the ground.

The elevator or secondary conveyor 552, which is in tandem relation to the conveyor 550 (FIG. 16) includes cooperating conveyor belts 684 and 686, later to be described, which are disposed between opposite sides 688 of a mounting frame or structure 690. The elevator 552 is mounted upon the frame structure 34 for lateral pivotal movement with the picker head 62 in a direction transversely of the harvester 30 when the picker head is moved horizontally. Accordingly, the bight 692 of a bracket 694 (FIGS. 16 and 17) interconnecting the sides 688 adjacent their upper ends is centrally pivoted to a rigid transverse strap 696 (FIG. 3) of the frame structure 34 by a bolt 698.

In addition, the position of the lower end portion of the elevator 552 can be adjusted to a limited extent longitudinally of the harvester 30 with respect to the rear end of the receiving conveyor 550. For this purpose, a shaft 700 (FIG. 16) is received in elongate slots 702 extending longitudinally of the mounting frame 690 in opposite legs 704 of a bracket 706, which rigidly interconnects the sides 688 below the bracket 694. A pair of collars 708, fixed to the shaft 700 at opposite sides, respectively, of each leg 704, hold the shaft 700 against axial movement in the bracket 706. The slots 702, however, permit limited relative pivotal movement between the shaft 700 and the elevator 552.

The shaft 700 (FIGS. 17 and 18) extends through and is axially slidable in vertical legs 710 of inner and outer right angle guides 712. The guides 712 are located between the legs 704 and to the right of the outer leg 704, respectively, and are secured to longitudinal angle bars 714 of the frame structure 34 for adjustment lengthwise of the harvester 30. A cap 716 on the outer end of the shaft 700 prevents unwarranted removal thereof from the associated guide 712 during lateral inward movement of the elevator 552. After the position of the elevator 552 has been adjusted longitudinally of the harvester 30 with respect to the receiving conveyor 550, the guides 712 are fixed to the angle bars 714. When thus positioned, the elevator 552 is free to pivot about the bolt 698. Such movement of the elevator 552 pivots the mounting frame 690 with respect to the shaft 700 while sliding the shaft axially in the guides 712.

A coupling 720 (FIGS. 17 and 18) is provided between the rear end of the receiving conveyor 550 and the elevator 552 and enables the receiving conveyor 550, when moved horizontally with the picker head 62, to pivot or move the elevator 552 sidewise. The coupling 720 (FIG. 18) comprises a substantially horizontal rod 722 which is fixed to the outer flange extension 582 of the receiving conveyor 550 and projects rearwardly therefrom. The projecting end portion of the rod 722 is slidable between opposite, vertical guide rails 724, secured in fixed horizontally spaced relation to the corresponding side 688 of the elevator mounting frame 690. During horizontal movement of the receiving conveyor 550 with the picker head 62, the rod 722 moves laterally and endwise in engagement with the guide rails 724 and pivots the elevator. Thus, the coupling 720 maintains the elevator 552 in operating relation with the receiving conveyor 550.

The conveyor belt 684, located toward the rear of the elevator 552, has a width similar to that of the belt 572 and is trained about drive and idler rollers 730 and 732, respectively. The rollers 730 and 732 are fixed to shafts 731 and 733 (FIG. 16), respectively, that are journalled in the sides 688 adjacent the top and bottom of the mounting frame 690. The belt 684, when mounted in this way, extends from a lower location below the main idler roller 576 of the receiving conveyor 550 to an upper location well above the associated bag 84. During operation of the elevator 552, the front reach 734 of the belt 684 moves upward. Thus, a plurality of rigid transverse flights 736 projecting at substantially right angles from the belt 684, pass upward in the reach 734 (FIG. 16) close to the idler roller 576 of the receiving conveyor 550.

The other conveyor belt 686, which has a width similar to that of the belt 684, is trained about drive and idler rollers 738 and 740, respectively. The rollers are secured to shafts 739 and 741, respectively, which are journalled in the sides 688 in front of the belt 684 and, during operation of the elevator, the rear reach 742 of the belt 686 is moved upward in parallel, forwardly spaced relation to the reach 734. The drive roller 738 is in general, opposite to but slightly higher than the drive roller 730, for a purpose to become apparent hereinafter. The idler roller 740 is spaced upward from and slightly to the rear of the idler roller 576. Thus, a space is provided between the belts 572 and 686 passing about the rollers 576 and 740, respectively.

A plurality of narrow flexible tongues 744 (FIGS. 16 and 17) of belting or other similar material are fixed to the belt 686 in peripherally extending, transversely spaced rows. The tongues of each row (FIG. 16) are spaced approximately a foot apart and the tongues of adjacent rows are in staggered relation. The tongues trail from their points of attachment to the belt 686 and when descending the front reach, stand out from the belt. Thus, when the tongues 744 approach the idler roller 576 they function as flaps and strike against the beans on the receiving conveyor 550 with a firm but yielding force and aid in compacting the beans thereon and in moving the beans harmlessly beneath the idler roller 740.

A drive 750 (FIGS. 1 and 3) for the elevators 552 and 552' comprises a shaft 752 journalled in opposite bearings 754 mounted on the rear transverse beam 38. As shown best in FIG. 19, a V-belt 756 that is trained about a drive pulley 758 on the shaft 752, is also trained about a pulley 760 secured to the shaft 731 to which the drive roller 730 of the belt 684 is fixed. The lower reach 764 of the belt 756, extending between the pulley 758 and the pulley 760, is trained over a pulley 766 secured to the shaft 739 to which the drive roller 738 of the belt 686 is fixed. Additionally, the reach 764 is trained beneath an elongate, vertically adjustable idler roller 770 which is mounted on the frame structure 34 by a bracket 772, the idler roller 770' and the bracket 772' (FIG. 1) being shown most clearly. Adjustment in the position of the roller 770 enables maintenance of suitable tension on the belt 756 to hold the same in engagement with the pulleys 758, 760, and 766 to drive the elevator 552. Because of the length of the roller 770, it is assured that the belt 756 will remain in engagement therewith while the belt is moved with the elevator 552 throughout its full range of lateral pivotal movement.

Upon operation of the drive 750, by means later to be described, the belts 684 and 686 (FIG. 16) of the elevator 552 are driven in the direction mentioned. A layer of beans, advanced by the receiving conveyor 550, is engaged between both belts 572 and 686 as the beans pass around the upper end of the conveyor 550, and the beans are advanced thereby against the upwardly moving reach 734 of belt 684. The beans, thus moved against the belt 684, are engaged by the flinghts 736 and moved upward thereby between the reaches 734 and 742 which cooperate in raising the beans to the top of the elevator 552. Due to the previously mentioned relation of the rollers 730 and 738 to each other, beans are discharged from the elevator rearwardly of the harvester. A chute 774 (FIGS. 3 and 16), mounted on the elevator frame 690 adjacent the top thereof, directs the beans discharged from the elevator downward into the associated bag 84 (FIG. 3).

*Picker head drive*

The drive 86 (FIG. 19) includes a variable speed transmission system 780, for operating the picker heads 62 and 64 and the associated receiving conveyors 550 and 550', and a constant speed transmission system 782, for operating the elevator drive 750. It is to be understood that the various components of the two transmission systems are of standard construction and are mounted on the chassis 32 and operated in accordance with well known practice. The transmission system 780 comprises a first power trans 783 having a belt and pulley arrangement 784 which is connected to the drive shaft 785 of the motor 48 and leads to a pulley 786 on an auxiliary shaft 788. The pulley 786 is selectively engageable in driving relation with the auxiliary shaft 788 by a manually operated clutch 790. Another belt and pulley arrangement 794, which is connected to the auxiliary shaft 788, includes a variable diameter pulley 796 connected in driving relation to a stub shaft 798. The pulley 796, hereinafter called the variable pulley, is of any well known type which is self-adjusting in accordance with the tension exerted on the belt engaging the pulley to vary the effective diameter thereof.

The stub shaft 798 is rotatable in a lever 800, pivoted on the frame structure 34. A double acting, hydraulically actuated power cylinder 802 having a plunger 804 projecting from one end is pivoted at its other end on the frame structure 34 adjacent the lever 800. The outer end of the plunger 804 is pivotally connected to the outer end of the lever 800 to move the same between a projected position (FIG. 19) and a retracted position (not shown) to change the tension on the belt 794 leading to the variable pulley 796. In this way, when hydraulic fluid under pressure, from a source not shown, is directed by controls (not shown) through the line 806 to the cylinder 802 the lever 800 is retracted from the position shown in FIG. 19, to reduce the effective diameter of the pulley 796 and thereby increase the speed of the stub shaft 798. Fluid supplied through the line 808 to the cylinder 802 projects the lever from the retracted position (not shown) to increase the effective diameter of the pulley 796 and thereby reduce the speed of the stub shaft 798.

A second power train 814 of the variable speed transmission system 780 includes a gear type change speed transmission 816 having a speed range selector lever 818. The power input shaft 820 of the transmission 816 is drivingly connected with the stub shaft 798 of the variable pulley 796 by chain and sprocket arrangement 822. The power output shaft 824 of the transmission 816 is connected to a chain and sprocket arrangement 826 having a sprocket 828 releasably connected by an overload clutch 830 to a stub shaft 832.

A chain 834 (FIGS. 3 and 19), for driving the picker head conveyor 126, is trained about a sprocket 836 fixed to the stub shaft 832 and about an idler sprocket 837 fixed to another stub shaft 838, adjacent the rear of the harvester. The stub shaft 838 is located centrally of the horizontal portion 36 and is journalled in a bearing (not shown) on one of the beams 38. The chain 834 is also trained about another idler sprocket 840 which is rotatably mounted adjacent the rear of the picker head 62 on the frame structure 34. The lower reach of the chain 834 passes over and has driving engagement with a picker head drive sprocket 842 (FIGS. 3 and 19). The sprocket 842 is journalled in the frame structure 34 and is connected to the upper shaft 138 of the picker head 62 by a drive shaft 844. Universal joints 846 (only one shown, FIG. 6A) provided in the drive shaft 844, give the same the flexibility necessitated by the offset relation of the sprocket 842 and the shaft 138 and by adjustment of the position of the picker head 62.

A chain 850 for driving the conveyor 126' of the picker head 64 is trained about a sprocket 852 on the shaft 838 and about a picker head drive sprocket 854. The sprocket 854 is journalled in the frame structure 34 and is connected to the upper shaft 138' of the picker head 64 by a drive shaft 856 (FIGS. 1 and 19). Universal joints 858 (FIG. 1) are provided at each end of the drive shaft 856 for reasons similar to those pointed out in connection with the universal joints 846 in the drive shaft 844.

The constant speed transmission system 782, for driving the elevators 552 and 552' (FIGS. 1, 3, and 19), has a belt and pulley arrangement 860 connecting the drive shaft 785 of the motor 48 and a pulley 862 on an auxiliary shaft 864. The pulley 862 is selectively engageable in driving relation with the shaft 864 by a manually operable clutch 866. A right angle drive 868 of the transmission system 782 has a power input shaft 870 interconnected by a chain and sprocket arrangement 872 with the auxiliary shaft 864. A similar chain and sprocket arrangement 874 drivingly interconnects the power output shaft 876 of the right angle drive 868 and the transverse shaft 752 of the elevator drive 750.

When the motor 48 is running and a manually operable clutch 880, interposed in the drive shaft 785 is engaged, the motor drive shaft 785 is set in operation to thereby drive the pulleys 786 and 862. Engagement of the clutch 790 connects the pulley 786 to the shaft 788 to thereby drive the variable pulley 796. Operation of the variable pulley 796 is effective to drive the second power train 814 which is drivingly interconnected with the picker head conveyors 126 and 126' in the manner previously described. The conveyors 126 and 126' are drivingly interconnected with the associated foliage lifting devices 74 and 74' and the receiving conveyors 550 and 550', respectively, as explained hereinbefore. The speed at which the conveyors 126 and 126' are to be operated is obtained by appropriately setting the selector lever 818 of the change speed transmission 816 and by actuating the lever 800 by means of the power cylinder 802 to control the variable pulley 796. It will be apparent that the conveyor 126, the foliage lifting device 74 and the receiving conveyor 550 of the picker head 62 are driven synchronously with the corresponding components of the picker head 64. The elevators 552 and 552' are set in operation when the clutch 866 is engaged to connect the pulley 862 with the shaft 864. It will be understood that the elevators operate at a faster speed than the fastest speed at which the receiving conveyors 550 and 550' will be operated to assure that beans will be removed therefrom under all operating speeds thereof.

*Operation*

Hereinbefore, the apparatus embodying the present invention and its operation have, in general, been described concurrently. However, the spacing of the picker bar assemblies in the picker heads and the relationship of the opposite picker bar assemblies to each other, as well as their speed of movement have not been disclosed. Therefore, the following description of the operation will be directed principally to these factors and their effect on the harvesting or picking of beans by use of the harvester 30 of the present invention.

As understood best from FIG. 20, in one embodiment of the machine the adjacent picker bars of each picker head are spaced 15 inches apart. The conveyors 126 and 126' are arranged so that the picker bar on one conveyor ascending the inner reaches 128 and 128', is approximately seven and a half inches above an adjacent picker bar on the other conveyor. Thus, the picker bar assemblies 78 or 78' of one picker head will operate on the plants at one side of the row 72 at a location approximately halfway between the picker bar assemblies of the other picker head, operating on the opposite side of the row.

It has been found that, when harvesting beans from plant rows having a thickness in the order of four inches, the horizontal positions of the picker heads 62 and 64 are adjusted so that the picker bars 152 and 152' overlap each other about one inch, somewhat as illustrated in FIG. 20. Similarly, when the plant row has a general thickness in the order of twenty inches, the horizontal positions of the picker heads 62 and 64 are adjusted so that the opposite picker bars 152 and 152' do not overlap but are spaced two inches apart (not shown). It will be understood that, when the plant row is of intermediate thickness the horizontal positions of the picker heads are adjusted so that the picker bars 152 and 152' have a relationship intermediate the two extremes mentioned. The foregoing dimensions of the plant row and the horizontal relationship of the opposite picker bars to each other are only illustrative, and do not imply that the harvester 30 of the present invention is not capable of efficiently picking beans from plant rows having thickness within a different or a wider range.

When the horizontal spacing of the picker heads is related to the plant row thickness in the manner described, the bean vines in the portion of the row between the picker heads is engaged on opposite sides and pressed inward by the opposite picker bars 152 and 152'. The relationship of the opposite picker bars 152 and 152' to each other gives a cross section of the row portion between the picker heads a vertically extending zig-zag configuration or series of waves, such as illustrated in FIG. 20.

When the harvester 30 is in the position previously described, preparatory to harvesting beans from the row 72, and the horizontal spacing of the picker heads 62 and 64 has been set in accordance with the thickness of the row, the speed of the conveyors 126 and 126' is set to advance the picker bar assemblies 78 and 78' upward at approximately one hundred sixty-seven feet per minute. It will be assumed that the foliage of the bean plants is heavy, necessitating the use of the foliage lifting devices 74 and 74', which are connected to the conveyors 126 and 126' to be driven thereby. The harvester 30 is then advanced along the row at about sixty-eight feet per minute or a little more than three quarters of a mile per hour. As the harvester 30 advances along the row 72 the foliage lifting paddles 370 and 370', operating opposite each other on the sides of the row 72, raise the foliage and expose the beans to the action of the picker bars 152 and 152'. The picker bars 152 and 152' operate on an area of the row having a width equal to the length of the picker bars, i.e., four feet, and a height of substantially five and one-half feet, i.e., the length of the reaches 128 and 128' of the conveyors 126 and 126'. Thus, when the harvester and the conveyors 126 and 126' operate at the speed mentioned, the picker bars move upward at about thirty-three inches per second and move forward at about thirteen and one-half inches per second. For this reason, the picker bars 152 and 152' ascending opposite sides of the row, follow a path that is inclined forward and upward at approximately 23° relative to the vertical.

It may be deduced from the previously stated facts that six or seven picking bars, at one side of the harvester 30, pass a given point or bean on the row 72 before the picker heads 62 and 64 pass therebeyond. Even though the plant row may be thick, the individual vines are, nevertheless, relatively widely spaced from each other. This enables the beans, located remotely from either side of the row, to be exposed to the picking action of the bars 152 and 152' at one side of the row or under some conditions to be exposed alternately at opposite sides of the row. Thus, it will be seen that, if a mature bean is not ideally positioned so as to be engaged and picked by the first passing picker bar, it undoubtedly will be moved to such a position and engaged by a following picker bar before the picker heads pass beyond the bean.

Irrespective of whether the plant row is thick or thin, the relationship of the opposite picker bars 152 and 152' to each other, and the configuration and arrangement of the primary undulations thereof are important factors in the removal of the beans from their vines, and each factor produces its own characteristic motion in the vines of the plant row 72 during the harvesting operation. The first factor controlling the movement of the vines is the vertically staggered relationship of the picker bars of the opposed heads, as particularly shown in FIG. 20. Due to the staggered relation of the opposite picker bars there is a tendency for waves to be produced in the bean vines as the picker bars ascend the row during advance of the picker heads, such waves having ridges and troughs extending longitudinally of the row. It will be evident that these such ascending waves have a tendency to flip the beans outwardly away from the row.

The second factor that effects the movement of the bean vines results from the fact that, as seen in FIGS. 11 and 20, the crests 236 of the bars on one head are opposite, in vertically staggered relation to corresponding crests 236' of the bars on the other picker head. Thus, the mass of bean vines located between opposite hollows 238 and 238' is relatively less compacted or compressed by the picker bars than is the mass of vines between the opposite crests 236 and 236'. As the picker heads are advanced along the row, the intertwined vines are cammed by the oblique deflectors 242 and 242' between the picker bars 152 and 152'. The vines, thus, confined between the picker bars 152 and 152' are acted upon at opposite sides of the row by the symmetrically arranged crests 236 and 236' and hollows 238 and 238'. A given area of bean vines is alternately compressed and released by the advancing picker bars. Again, this compression and expansion of the vine mass tends to swing the beans toward a horizontal position in which they can be effectively engaged by the picker bars. The third factor effecting the movement of the vines is the relationship of the forward speed of the harvester and the upward speed of the picker bars. Referring to FIG. 11, it will be evident that, if the harvester were stationary and the picker bars 152 and 152' are moved upwardly, vertical waves would be formed in the row by the undulations and such waves would have crests and valleys corresponding to the valleys and crests respectively of the picker bars. However, when the harvester is moving forwardly the bars move upward more rapidly than they are advanced along the row. Accordingly, the waves that tend to be formed are not actually vertical but are disposed about 23 degrees off the vertical. The obliquely disposed crests and valleys in the vines cut across the ascending waves which tend to form due to the previously mentioned vertical staggering of the picker bars.

Accordingly, the three above-mentioned factors coact to set up a complicated movement in the vine row, and this movement is particularly effective in swinging the vines and the beans to positions in which they can be effectively contacted by the picker bars.

As previously described and as noted in FIG. 11, the length and amplitude of the primary undulations 230 and 230' of the picker bars 152 and 152', respectively, decrease progressively from the leading to the trailing ends thereof. This assures that the frequency of the motion produced in the vines adjacent the trailing end of the picker bars or at the trailing side of the obliquely advancing stream of symmetrical fluctuations is more rapid than at the leading side.

As shown in FIG. 21, the individual beans 888 of a characteristic cluster 890 thereof are attached by slender secondary stems 892 to the upper portion of a primary stem 894, growing generally upward from its point of attachment to the entangled or intertwined vines 896. The effect on the vines 896 of the waves and fluctuations produced in the plants of the row, sets the individual beans 888 in pendulous motion on their secondary stems 892 and sets the entire cluster in a lateral motion transversely of the row 72 on the vibrating primary stems 894. Thus, the individual beans partake of a compound motion resulting from the intersecting streams of motion. The obliquely advancing stream of symmetrical fluctuations which produce motions of alternately intense and reduced vigor, aid in freeing or disentangling remotely located mature beans which may be temporarily caught in the entangled vines, and aid in moving such beans close to the sides of the row. In addition, these changes in motion intensity continually change the frequency and the amplitude of the pendulous motion of the mature beans and thereby increase the probability that they will quickly assume a position in which they will engage over one of the upwardly moving picker bars and be picked.

Because of the weight of the mature beans, such beans, once engaged over the picker bars 152 and 152', tend to "lock" in the secondary undulations 232 and 232' thereof, see FIG. 21. The beans lodge in the notch-like openings provided by these undulations, and the sides of such openings aid in holding the beans in picking relation with respect to the picker bar. Thus, the beans, which do not hang vertically or are in pendulous motion, are prevented from flipping back over and out of picking engagement with the picker bars. When the mature beans are engaged over the picker bars (FIG. 21), the secondary stems 892 are snapped by the action of the rapidly rising picker bars 152 and 152'. The picked beans fall to the receiving conveyors 550 and 550' of the conveyor systems 80 and 82 and are delivered thereby to the bags 84 in the manner previously described.

It will be understood that the weight of the individual bean blossoms as well as the weight of the individual immature beans is considerably less than that of the mature beans. As a result, the lightweight blossoms and immature beans flip harmlessly back over the picker bars even though they might have been engaged therewith in the manner of the mature beans (FIG. 21) in picking position. For this reason, the blossoms and the immature beans sustain little or no damage even though the rapidly rising picker bars are in picking engagement with the vines throughout the full height of the row 72. Therefore, the blossoms and the immature beans are left to develop, and the resulting mature beans are harvested at a later time.

Since the beans mature to progressively higher levels in the row 72 as the growing season advances, it may be advantageous to restrict the height of the early picking to a relatively low level by use of a cam portion 265a (FIG. 10). During succeeding pickings, the height of the area from which beans are to be picked can be increased by substitution of other cam portions 265a having shorter straight portions 271.

It will be apparent that the easiest-to-harvest beans are those which are nearest the sides of the row 72 and these beans are picked by the leading end portions of the picker bars. The increased frequency of the fluctuations produced by the trailing end portions of the picker bars bring the more difficult-to-reach beans to the side of the row where they are easily engaged and picked by the rear or trailing portions of the picker bars.

When the advancing harvester 30 arrives at one of the posts 88 or 90, the oblique deflectors 242 and 242' of the picker bars 152 and 152', respectively, come into camming engagement with the opposite sides of the post. As the harvester continues to advance, the picker bars are pivoted downward against the action of the torsion springs 192. It will be understood that the picker bars will be pivoted further downward while the crests 236 and 236' engage the posts than when the posts are between the hollows 238 and 238'. Thus, the picker bars return to, or nearly to, their usual bean picking positions with respect to the row when the post is between opposite hollows 238 and 238'. Therefore, due to the configuration of the picker bars in the hollows 232 and 232' where they merge into the adjacent crests 236 and 236', respectively, ahead of and behind a post, the picker bars 152 and 152' of the present invention are able to pick beans close to the posts.

Less of a striking force may be required of the picker bars to snap the stems of beans which are larger than the average three to six inch mature beans described previously. When such heavier beans are picked the speed of the conveyors 126 and 126' may be reduced from the thirty-three inches per second speed previously described. Conversely, beans of lighter weight than those described, may require a greater striking force to snap the bean stems. Accordingly, if lighter-weight beans are being picked the speed of the conveyors 126 and 126', carrying the picker bars 152 and 152' is increased. When this latter condition obtains, the ground speed of the harvester may be increased from the speed of thirteen and a half inches per second previously mentioned. Both the speed of the harvester and that of the conveyors 126 and 126' can be varied in the manner set forth previously. The harvester 30 is effective to pick from the vines a high percentage of beans coming within the sizes mentioned even though the speed of the harvester and the upward speed of the picker bars 152 and 152′ may be varied within a considerable range. Since the immature beans, the blossoms and the mature beans, which are not fully engaged in picking position over the picker bars, flip unharmed from the picker bars, the unharvested beans are not broken and are free from bruises and the blossoms are undamaged. It is thus assured that beans can be harvested several times during the growing season.

Picker bars 900, 920, and 930 of modified form are disclosed in FIGS. 22, 23, and 24, respectively. Since the opposite picker bars of each of these forms are similar to each other, except that they are adapted for use in the right hand or left hand picker heads 62 or 64, only the right hand picker bar of each form will be described in detail.

The picker bar 900 (FIG. 22) comprises a straight bean engaging rod 902 of circular cross-section having a diameter of ¼ inch. Tangs or legs 904, similar to the tangs 197 of the picker bar 152, FIG. 11, are fixed to the rod 902 and project from one side thereof. These tangs or shanks 904 are spaced apart to register with the sockets 196 of the picker bar carrier 156. Notches 906 in the upper edges of the tangs 904 are equally spaced from the rod 902. When the picker bar 900 is installed in the picker bar assembly 78, the detents 202 of the latches 200 enter the notches 906 and operatively mount the picker bar 900 on the conveyor 126. The rod 902 is, thus, in parallel relation to the longitudinal center line of the harvester.

It will be noted that a portion 908 of the tang 904, at the leading end of the picker bar 900 (left hand side of FIG. 22) provides the rod 902 with an oblique deflector which is angled laterally and forward of the harvester. When the picker bar 900 is in use in the advancing harvester 30, the angled portion 908 engages the posts 88 and 90 and cams the rising picker bar into a downward position. The rod 902 remains in engagement with the post to hold the picker bar retracted until the post has been passed.

Operation of the harvester 30, when equipped with the picker bar 900, is similar to that of the harvester when equipped with the picker bar 152 except that the picker bar 900 produces in the vines an ascending wave motion only.

The picker bar 920 (FIG. 23) differs from the picker bar 900 in that the single bean engaging rod 922 has undulations 924 throughout its length. The undulations 924 are similar in size to the secondary or small undulations 232 of the picker bar 152 and extend parallel to the reach 128 of the conveyor 126 when the picker bar 920 is in use in the picker head 62. The undulations 924 "lock" the beans in picking engagement with the picker bar 920 in the manner described in connection with the undulations 232 and 232′ of the picker bars 152 and 152′. Like the picker bar 900, the picker bar 920 produces in the vines only an ascending wave motion when employed in the harvester 30.

The picker bar 930 (FIG. 24) differs from the picker bar 920 in that it employs two parallel bean engaging rods 932 and 934 having undulations 936 and 938, respectively, like the undulations 924 in the rod 922. The rods 932 and 934 are spaced approximately 2 inches apart and the undulations 936 and 938 extend parallel to the reach 128 of the conveyor 126 when the picker bar 930 is used in the picker head 62. Either rod 932 or 934 can act independently to pick beans in the manner described in connection with picker bar 920. Therefore, since the picker bar 930 employs two rods, the number of beans picked by each picker bar 930 is increased over the number picked by the picker bar 920.

The parallel rods 932 and 934 of the picker head 930 cooperate to perform a picking operation distinct from that performed by the picker bars described hereinbefore. The spacing of the rods 932 and 934 enables the beans, for the most part, to engage over the rod 932. As the picker bar 930 rises, beans so positioned and of mature size, that is, those exceeding in length the distance between the rods 932 and 934, are prevented by the rod 934 from pivoting about the rod 932 and out of picking engagement with the picker bar 930. Thus, the end portions of the beans, remote from the stems, engage under the rod 934 to securely hold the beans against the rod 932 as this latter rod snaps the stems and frees the beans from the vines. It will be clear, that due to the spacing of the rods 932 and 934, the picker bar 930 performs an automatic sizing operation, since it can rarely pick beans which are shorter than the spacing between the rods 932 and 934.

The undulations 936 and 938 "lock" the beans against sliding movement along the rods 932 and 934 for the purpose set forth hereinbefore.

Because of the positive picking action performed by the picker bar 930, less of a striking force is required of this picker bar in performing the bean picking operation than is required of a picker bar having a single rod. As a result, the rods 932 and 934 may be of smaller diameter than the ¼ inch used in the picker bars previously described herein. Since the smaller rods tend to snap the beans from their stems more easily than do the larger diameter rods, it will be apparent that picker bars 930 constructed with smaller rods 932 and 934 may be raised at a slower speed and thereby further prevent damage to the beans.

It will be understood that other picker bars (not shown) employing beans engaging rods of straight or sinuous configuration in any combination suggested by the picker bars 152, 900, 920, and 930 of FIGS. 11, 22, 23, and 24, respectively, is contemplated by the present invention. Thus, picker bars comprising a bean engaging rod having large undulations only similar to those of the picker bar 152 or picker bars having two parallel rods, one or both of which may be straight, are contemplated. Further modifications may comprise two equally spaced rods, both of which have large undulations and one or both of which have small undulations.

Thus, it will be apparent from the foregoing description that the bean harvester 30 of the present invention is highly effective for its intended purpose as may be understood from the objects set forth earlier.

While a particular embodiment of the present invention has been shown and described, it will be understood that the present bean harvester set forth above is capable of modification and variation without departing from the principles of the invention and that the scope of the invention should be limited only by the scope and proper interpretation of the claims appended hereto.

The invention having thus been described, what is believed to be new and desired to be protected by Letters Patent is:

1. A bean harvester comprising a frame structure, opposite picker heads mounted in said frame structure for horizontal movement toward and away from each other to change their positions in the frame structure to accommodate plant rows of different widths between said picker heads, an elongate actuating bar, means on said frame structure guiding said actuating bar for longitudinal movement, links pivotally interconnecting said picker heads and said actuating bar, and actuating means connected to said actuating bar for moving the same longitudinally to bring said picker heads into a desired horizontal position.

2. A bean harvester comprising a frame structure, opposite picker heads mounted in said frame structure for horizontal movement toward and from each other and for vertical movement, an elongate actuating bar, links pivotally interconnecting said picker heads and said actuating bar, means on said frame structure for guiding said actuating bar for longitudinal movement throughout a range of vertical movement of said picker heads, and actuating means pivotally connected to said actuating bar and to said frame structure for moving said actuating bar longitudinally to vary the horizontal relation of said picker heads with respect to the frame structure throughout their range of vertical movement.

3. In a bean harvester, conveyor means, and a picker bar assembly connected to said conveyor means for movement therewith in performing a bean picking operation, said picker for assembly comprising a picker bar, an elongate mounting leg connected to said picker bar and projecting therefrom, said mounting leg having a groove thereacross, a mounting bracket carried by said conveyor means, an elongate arm projecting from said mounting bracket and defining a longitudinal socket adapted to receive said mounting leg in mating relation therein, said arm having a slot thereacross and communicating between the socket and the exterior of said arm, and a removable detent adapted to enter said slot and said groove when said mounting leg is inserted into said socket and said groove is in registry with said slot, thereby removably retaining said mounting leg in said arm to mount said picker bar in said bracket.

4. In combinationi in a bean harvester, an elongate bean engaging rod, opposite rod support means connected to said bean engaging rod adjacent the ends thereof and mounting the same in generally parallel relation to an axis for rotation about said axis, torque transmitting means rigidly interconnecting said opposite rod support means for pivotal movement about said axis, first stop means having a fixed angular position with respect to said axis adjacent an end of said bean engaging rod and engageable by one of said opposite rod support means for limiting rotation of said bean engaging rod in one direction to establish a predetermined position thereof, intermediate rod support means connected to said bean engaging rod between the ends thereof and mounted for pivotal movement about said axis, resilient means urging said opposite rod support means in said one direction about said axis toward said first stop means, second stop means carried by said torque transmitting means and engageable with said intermediate rod support means to limit pivotal movement thereof in said one direction to a certain position with respect to said torque transmitting means to dispose said intermediate rod support means in alignment with said opposite rod support means, and resilient means urging said intermediate rod support means in said one direction about said axis toward said second stop means.

5. In a beam harvesting machine having a frame structure, a picker head, a picker head mounting shaft, means interconnecting said mounting shaft and said picker head to retain the same for adjusting the positions thereof in the frame structure, and means rotatably mounting said mounting shaft for lateral movement longitudinally of said frame structure, said shaft mounting means comprising a support bracket fixed to said frame structure and having a horizontal planar surface, a bearing, a rectangular plate secured to said bearing and slidably mounted on the planar surface of said support bracket, opposite guides on said planar surface confining said rectangular plate for sliding movement longitudinally of said frame structure, an upstanding rotatable sleeve in said bearing receiving the lower end of said shaft, a boss on said shaft in coaxial relation thereto and extending part way around the same adjacent the lower end of said shaft and having a lower shoulder engaging the upper edge of said sleeve when said shaft is inserted into the same to mount said shaft for rotation in said bearing, and an elongate bar secured to said support bracket in parallel relation to said planar surface and to said opposite guides and engaging the upper shoulder of said boss, said elongate bar being effective to restrain said shaft from removal axially from said sleeve throughout limited pivotal movement of said mounting shaft in said bearing during lateral movement of said shaft while enabling removal of said shaft from said bearing sleeve upon rotation of said shaft to remove said boss from engagement beneath said elongate bar.

6. A picker bar for a bean harvesting machine comprising an elongate wire like bean engaging rod of sinuous configuration providing a plurality of primary undulations lying in a common plane, and leg means fixed to said rod and projecting laterally from one side thereof in the plane of said undulations.

7. A picker bar according to claim 6 wherein said bean engaging rod is further provided with a plurality of additional undulations throughout the length thereof extending in said plane and being smaller than said primary undulations.

8. A picker bar for a bean harvesting machine comprising an elongate wire like bean engaging rod of sinuous configuration providing said rod with a plurality of undulations lying in a common plane, said rod being adapted for endwise movement in one direction along a row of bean plants, said undulations diminishing progressively in length and amplitude from the leading end toward the trailing end of said rod and providing the same with a plurality of crests and hollows having progressively diminishing dimensions, and leg means fixed to said rod and projecting laterally from one side thereof in the plane of said undulations to mount said rod.

9. A picker bar for a bean harvester comprising elongate wire like string bean engaging rods extending in parallel planes and spaced apart a distance less than the length of a bean to be harvested and adapted for endwise movement in one direction along a row of bean plants, an oblique deflector at the leading end of one rod and directed laterally and forward toward the other rod in a plane normal to said parallel planes, and leg means connected to said other rod and projecting from the side thereof and away from said one rod in said plane to mount said rods.

10. A picker bar for a bean harvesting machine comprising an elongate wire like bean engaging rod of sinuous configuration adapted for endwise movement in one direction along a row of string bean plants, said sinuous configuration providing said rod with a plurality of undulations lying in a common plane and having a plurality of crests, said rod at the leading end thereof having a portion directed laterally and forward in said plane from the crest of the leading undulation to the leading end of said rod, and leg means fixed to said rod and projecting laterally from one side thereof in the direction of said laterally directed portion in the plane of said undulations.

11. A harvester comprising a mobile support structure, means for moving said structure forwardly along a path parallel to and closely adjacent a row of vines to be stripped, a plurality of stripper bars disposed generally parallel to said path and mounted for upward movement in said structure, means for moving said bars upwardly during forward movement of said structure, each of said stripper bars being a bent rod having a sinuous configuration with alternate crests and valleys whereby when said bar is pressed against a row of vines during upward and forward movement of said bar a wave pattern will be formed in said row corresponding to the configuration of said bar, the wave moving longitudinally of the row and extending in an upward and forward direction.

12. A harvester comprising a mobile support structure, means for moving said structure forwardly along a path parallel to a row of beans to be stripped, said structure having two elongate sections spaced apart to provide a channel extending longitudinally of the structure and adapted to receive the row of beans, and a set of stripper bars mounted in each section of said structure and projecting from the section into the channel, each bar being a bent rod disposed generally parallel to said channel and having a wave-like configuration having alternate crests and valleys along its length, the crests of the bars on one set being aligned vertically with each other and aligned transversely of said channel with the crests of the bars on the other set and the valleys of one set being aligned vertically with each other and transversely with the valleys of the other set, whereby the vine row will be alternately compressed between the crests of oppositely projecting bars and released by the valleys of said bars during forward movement of said structure along the bean row.

13. A harvester comprising a mobile support structure, means for moving said structure forwardly along a path parallel to a row of bean plants the beans of which are to be stripped, said structure having two elongate sections spaced apart to provide a channel extending longitudinally of said structure and adapted to receive the row of bean plants during forward movement of the structure, an endless chain of stripper bars mounted in each of said sections, each endless chain having an upwardly moving run disposed adjacent said channel with the bars of the chain projecting into said channel to a point past a vertical plane extending along the longitudinal centerline of said channel, each bar being a bent rod disposed generally parallel to said channel and having a wave-like configuration, the crests of the bars on one chain being aligned vertically with each other and aligned transversely of said channel with the crests of the bars on the other chain and the valleys of the bars on one chain being aligned vertically with each other and transversely of said channel with the valleys of the bars on the other chain, whereby the vine row will be alternately compressed between the crests of oppositely projecting bars and released by the valleys of said bars during forward movement of said structure along the bean row, the bars being so positioned on the upwardly moving opposed runs of said chains that the bars on one run are vertically spaced from the two adjacent bars on the other run whereby during upward movement of said opposed runs the opposite sides of the vine row are flexed in a series of vertically spaced regions to create vertically moving, substantially horizontal waves in the vines, the upward movement of said waves coacting with the alternate compression and release of said vine row to expose the beans to the action of said stripper bars.

14. A harvester comprising a mobile support structure, means for moving said structure forwardly along a path parallel to and closely adjacent a row of vines to be stripped, said structure having two elongate sections spaced apart to provide a channel extending longitudinally of said structure and adapted to receive the row of vines during forward movement of said structure, an endless chain of stripper bars mounted in each section, each bar being a bent rod disposed generally parallel to said channel and having a wave-like configuration having alternate crests and valleys, each endless chain having an upwardly moving run disposed adjacent said channel with the bars of the run projecting into said channel to a point past a vertical plane extending along the longitudinal centerline of said channel, the crests of the bars of one chain being aligned vertically with each other and aligned transversely of said channel with the crests of the bars on the other chain and the valleys of the bars on one chain being aligned vertically with each other and transversely of said channel with the valleys of the bars on the other chain, whereby the vines of said row in said channel will be alternately compressed between the crests of oppositely projecting bars and released by the valleys of said bars during forward movement of said structure along the vine row, the wave-like configuration of said upwardly moving bars being adapted to form a wave-like pattern in the row of vines during forward movement of the structure, the wave moving longitudinally of the row and extending in an upward and forward direction, the bars of said chains being so positioned on said chains that, when the bars are in said upwardly moving runs, the bars of one run are vertically spaced from the two adjacent bars on the other run whereby during upward movement of said runs the opposite sides of the vines are flexed in a series of vertically spaced regions to create vertically moving substantially horizontal waves in the vines, the upwardly moving substantially horizontal waves coacting with the forwardly moving upwardly and forwardly extending waves during alternate compression and expansion of the vine row to expose the beans of the vines to the action of the stripper bars.

References Cited by the Examiner

UNITED STATES PATENTS

| | | | |
|---|---|---|---|
| 1,923,405 | 8/33 | Wickersham | 56—364 |
| 1,948,975 | 2/34 | Urschel | 56—19 |
| 1,977,784 | 10/34 | Urschel | 56—19 |
| 2,447,122 | 8/48 | Horst | 56—130 |
| 2,537,945 | 1/51 | Lewis | 56—30 |
| 2,550,129 | 4/51 | Urschel | 56—130 |
| 2,587,553 | 2/52 | Ward | 56—130 |
| 2,675,663 | 4/54 | Ward | 56—130 |
| 2,834,172 | 5/58 | Wood | 56—19 |
| 3,057,413 | 10/62 | Proctor | 172—99 |

ANTONIO F. GUIDA, *Primary Examiner.*

CARL W. ROBINSON, T. GRAHAM CRAVER,
*Examiners.*